United States Patent
Hu

(10) Patent No.: US 10,904,361 B2
(45) Date of Patent: Jan. 26, 2021

(54) METHOD, APPARATUS, AND SYSTEM FOR IMPLEMENTING JAVA APPLICATION INSTALLATION BY MEANS OF CLOUD COMPILATION

(71) Applicant: Huawei Technologies Co., Ltd., Shenzhen (CN)

(72) Inventor: Hailiang Hu, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 468 days.

(21) Appl. No.: 15/261,424

(22) Filed: Sep. 9, 2016

(65) Prior Publication Data

US 2016/0378462 A1  Dec. 29, 2016

Related U.S. Application Data

(63) Continuation of application No. PCT/CN2015/095025, filed on Nov. 19, 2015.

(30) Foreign Application Priority Data

May 22, 2015 (CN) .......................... 2015 1 0268738

(51) Int. Cl.
  *H04L 29/08* (2006.01)
  *G06F 8/41* (2018.01)
(52) U.S. Cl.
  CPC ................ *H04L 67/34* (2013.01); *G06F 8/47* (2013.01); *H04L 67/10* (2013.01)

(58) Field of Classification Search
  CPC . G06F 8/68; G06F 8/658; H04L 67/10; H04L 67/34
  See application file for complete search history.

(56) References Cited

U.S. PATENT DOCUMENTS 7,174,544 B2  2/2007  Zee
8,887,181 B1*  11/2014  Gigliotti ............. G06F 9/44526
                                                               713/1

(Continued)

FOREIGN PATENT DOCUMENTS

CN  1858708 A  11/2006
CN  101546269 A  9/2009

(Continued)

OTHER PUBLICATIONS

Machine Translation and Abstract of Chinese Publication No. CN103051689, Apr. 17, 2013, 18 pages.

(Continued)

*Primary Examiner* — Doon Y Chow
*Assistant Examiner* — Timothy P Duncan
(74) *Attorney, Agent, or Firm* — Conley Rose, P.C.

(57) ABSTRACT

A method for implementing application program installation by cloud compilation includes sending, by a terminal device, hardware configuration information of the terminal device and version information of a target application program to an application market server, receiving, by the terminal device from the application market server, the upgrade information of the target application program, and performing, by the terminal device, optimized installation of the target application program according to the upgrade information to update a version of the target application program.

15 Claims, 10 Drawing Sheets

(56) References Cited

U.S. PATENT DOCUMENTS

| | | | |
|---|---|---|---|
| 2013/0232229 A1 | 9/2013 | Firman et al. | |
| 2014/0068018 A1 | 3/2014 | Roh et al. | |
| 2014/0068583 A1* | 3/2014 | Tejani | G06F 8/54 |
| | | | 717/163 |
| 2014/0189676 A1* | 7/2014 | Mahajan | G06F 8/43 |
| | | | 717/170 |
| 2015/0100955 A1 | 4/2015 | Chen et al. | |
| 2015/0128126 A1 | 5/2015 | Brunet et al. | |
| 2015/0154011 A1* | 6/2015 | Ceng | G06F 8/51 |
| | | | 717/137 |
| 2016/0004530 A1 | 1/2016 | Liang et al. | |
| 2016/0162688 A1* | 6/2016 | Call | G06F 8/65 |
| | | | 726/22 |

FOREIGN PATENT DOCUMENTS

| | | | | |
|---|---|---|---|---|
| CN | 102035892 | A | 4/2011 | |
| CN | 103019785 | A | 4/2013 | |
| CN | 103051689 | A | 4/2013 | |
| CN | 103051723 | A | 4/2013 | |
| CN | 103647816 | A | 3/2014 | |
| CN | 103701930 | A | 4/2014 | |
| CN | 103812946 | A | 5/2014 | |
| CN | 103902300 | A | 7/2014 | |
| CN | 104063239 | A | 9/2014 | |
| CN | 104321746 | A | 1/2015 | |
| CN | 105630543 | A | 6/2016 | |
| CN | 106681772 | A | 5/2017 | |
| EP | 2175366 | A1 | 4/2010 | |
| WO | WO2016149889 | | * 9/2016 | ............ G06F 9/445 |

OTHER PUBLICATIONS

Machine Translation and Abstract of Chinese Publication No. CN101546269, Sep. 30, 2009, 16 pages.
Machine Translation and Abstract of Chinese Publication No. CN103019785, Apr. 3, 2013, 31 pages.
Machine Translation and Abstract of Chinese Publication No. CN103647816, Mar. 19, 2014, 24 pages.
Foreign Communication From a Counterpart, Chinese Application No. 201510268738.0, Chinese Office Action dated Jan. 17, 2018, 12 pages.
Machine Translation and Abstract of Chinese Publication No. CN1858708, Nov. 8, 2006, 6 pages.
Machine Translation and Abstract of Chinese Publication No. CN103902300, Jul. 2, 2014, 7 pages.
Foreign Communication From a Counterpart Application, European Application No. 15882898.8, Extended European Search Report dated Apr. 18, 2017, 11 pages.
Foreign Communication From a Counterpart Application, PCT Application No. PCT/CN2015/095025, English Translation of International Search Report dated Feb. 15, 2016, 2 pages.
Machine Translation and Abstract of Chinese Publication No. CN105630543, Jun. 1, 2016, 16 pages.
Machine Translation and Abstract of Chinese Publication No. CN106681772, May 17, 2017, 11 pages.

* cited by examiner

METHOD, APPARATUS, AND SYSTEM FOR IMPLEMENTING JAVA APPLICATION INSTALLATION BY MEANS OF CLOUD COMPILATION

This application is a continuation of International Application No. PCT/CN2015/095025, filed on Nov. 19, 2015, which claims priority to Chinese Patent Application No. 201510268738.0, filed on May 22, 2015, both of which are hereby incorporated by reference in their entireties.

TECHNICAL FIELD

The present disclosure relates to the field of communications technologies, and in particular, to a method, an apparatus, and a system for implementing JAVA application installation by cloud compilation.

BACKGROUND

JAVA is an object-oriented program design language for writing cross-platform application software. A JAVA technology has excellent commonality, high efficiency, platform portability, and security, and is widely applied to personal computers (PCs), data centers, game consoles, scientific supercomputers, mobile telephones, and the Internet. In addition, the JAVA technology has a globally largest professional developer community. A JAVA platform is built using a JAVA virtual machine and a JAVA application programming interface. The JAVA language is a channel for accessing the platform. A program that is written and compiled using the JAVA language can run on the platform. Currently, JAVA is also used for developing application programs for an ANDROID platform in the terminal field.

A running policy of an ANDROID virtual machine is different from a running policy of an original JAVA virtual machine (the JAVA virtual machine runs in stack mode, and the ANDROID virtual machine runs in register mode). Therefore, during application program installation, in addition to decompressing an *.apk file and scanning intermediate code files such as a *.dex file, the ANDROID virtual machine further needs to perform binary compilation for a current hardware device. In the compilation process, hardware configuration information of the current hardware device is added to implement an optimization algorithm for optimizing an application program, and an optimized file obtained by compilation is saved to a system (the foregoing compilation process is also referred to as a compilation optimization process). When the application program runs, the hardware device directly copies and loads the optimized file obtained by compilation and a related method and a class library to an internal memory of the hardware device such that performance is improved when a JAVA application program runs.

However, in the prior art, when installing an application program, a hardware device downloads an *.apk file from an application market and obtains a *.dex file by decompression, then performs bytecode scanning and extraction, and further performs transcoding optimization according to current configuration information of the hardware device to obtain an *.oat file in a format of local machine code. When optimized installation is performed on the application program, before the *.oat file is obtained by transcoding, a compilation optimization module needs to be invoked to perform optimized intermediate code compilation on it according to the current configuration information of the hardware device. Although performance is improved when the application program runs, compilation optimization needs to be executed on a terminal device, which occupies running memory and storage space of the terminal device, prolongs installation time of the application program, and compromises user experience of JAVA application program installation.

SUMMARY

Embodiments of the present disclosure provide a method and an apparatus for implementing JAVA application program installation by cloud compilation, which can reduce device memory occupied for optimized installation of an application program, improve efficiency of the optimized installation of the application program, and enhance user experience of application program installation.

A first aspect of the embodiments of the present disclosure provides a method for implementing JAVA application program installation by cloud compilation, where the method may include sending, by a terminal device, hardware configuration information of the terminal device and version information of a target application program to an application market server to acquire, using the application market server, upgrade information that is of the target application program and is corresponding to the hardware configuration information and the version information of the target application program, receiving, by the terminal device, the upgrade information, fed back by the application market server, of the target application program, where the upgrade information includes a target code file that is corresponding to latest version information of the target application program and that is obtained by compiling, on a cloud server, an intermediate code file corresponding to the version information of the target application program, and performing, by the terminal device, optimized installation of the target application program according to the upgrade information to update a version of the target application program.

With reference to the first aspect, in a first possible implementation manner, the receiving, by the terminal device, the upgrade information, fed back by the application market server, of the target application program, includes receiving, by the terminal device, an optimized installation package that is corresponding to the latest version information of the target application program and is sent by the application market server, where the optimized installation package is generated by packaging the target code file corresponding to the latest version information of the target application program, the target code file is obtained by the cloud server by compilation according to an intermediate code file corresponding to all functions included in the version information of the target application program, and the optimized installation package is stored in the application market server.

With reference to the first possible implementation manner of the first aspect, in a second possible implementation manner, the performing, by the terminal device, optimized installation of the target application program according to the upgrade information to update a version of the target application program includes re-installing, by the terminal device, the target application program according to the optimized installation package to update versions of all the functions of the target application program to latest versions.

With reference to the first aspect, in a third possible implementation manner, the receiving, by the terminal device, the upgrade information, fed back by the application market server, of the target application program, includes receiving, by the terminal device, an incremental upgrade package, sent by the application market server, of the target application program, where the incremental upgrade package is generated by packaging a target code file of latest version information of a specified function in the target application program, the target code file is obtained by the cloud server by compilation according to an intermediate code file corresponding to the specified function to be upgraded and optimized in the target application program, and the incremental upgrade package is stored in the application market server.

With reference to the third possible implementation manner of the first aspect, in a fourth possible implementation manner, the performing, by the terminal device, optimized installation of the target application program according to the upgrade information to update a version of the target application program includes converging, by the terminal device, the incremental upgrade package of the target application program and an installation package corresponding to the version information of the target application program to generate an installation package that is of the target application program and includes the latest version information of the specified function, and re-installing the target application program according to the installation package to update a version of the specified function of the target application program to a latest version.

A second aspect of the embodiments of the present disclosure provides a method for implementing JAVA application program installation by cloud compilation, where the method may include acquiring, by a cloud server, hardware configuration information of a target terminal device and an intermediate code file of a built-in target application program of the target terminal device that are sent by an application market server, determining, by the cloud server according to the hardware configuration information of the target terminal device and a correspondence between hardware configuration information, stored by the cloud server, of a terminal device and version information of an application program, whether a version of the built-in target application program of the target terminal device is a latest version, if the version of the built-in target application program of the target terminal device is not the latest version, compiling the intermediate code file of the target application program according to latest version information to obtain a target code file corresponding to the latest version information of the target application program, and sending, by the cloud server, the target code file corresponding to the latest version information of the target application program to the application market server to send, using the application market server, the target code file corresponding to the latest version information of the target application program to the target terminal device.

With reference to the second aspect, in a first possible implementation manner, the determining, by the cloud server according to the hardware configuration information of the target terminal device and a correspondence between hardware configuration information, stored by the cloud server, of a terminal device and version information of an application program, whether a version of the built-in target application program of the target terminal device is a latest version includes matching, by the cloud server, the hardware configuration information of the target terminal device with hardware configuration information, stored by the cloud server, of various terminal devices, and determining whether the hardware configuration information of the target terminal device is any one piece of the hardware configuration information, stored by the cloud server, of the terminal devices, if the hardware configuration information of the target terminal device is any one piece of the hardware configuration information stored by the cloud server, determining, according to a correspondence between the hardware configuration information of the terminal devices and version information of application programs, latest version information that is of the target application program and is corresponding to the hardware configuration information of the target terminal device, and matching version information of the built-in target application program of the target terminal device with the latest version information of the target application program to determine whether the version of the built-in target application program of the target terminal device is the latest version.

With reference to the second aspect, in a second possible implementation manner, the compiling the intermediate code file of the target application program according to latest version information, to obtain a target code file corresponding to the latest version information of the target application program includes matching version information of the built-in target application program of the target terminal device with the latest version information of the target application program, and determining upgrade information of a specified function that is newly added in the latest version information of the target application program, and compiling, according to the upgrade information of the specified function, an intermediate code file included in an installation package of the built-in target application program of the target terminal to obtain the target code file that is corresponding to the latest version information of the target application program and includes latest version information of the specified function, and packaging the target code file to generate an optimized installation package corresponding to the latest version information of the target application program.

With reference to the second aspect, in a third possible implementation manner, the compiling the intermediate code file of the target application program according to latest version information, to obtain a target code file corresponding to the latest version information of the target application program includes matching version information of the built-in target application program of the target terminal device with the latest version information of the target application program, and determining upgrade information of a specified function that is newly added in the latest version information of the target application program, and compiling, according to the upgrade information of the specified function, an intermediate code file corresponding to the specified function to generate a target code file corresponding to latest version information of the specified function, and packaging the target code file to generate an incremental upgrade package of the target application program.

With reference to any one of the second aspect to the third possible implementation manner of the second aspect, in a fourth possible implementation manner, before the acquiring, by a cloud server, hardware configuration information of a target terminal device that is sent by an application market server, the method further includes acquiring, by the cloud server, hardware configuration information of at least one terminal device of at least one hardware configuration type from an application market using the application market server, acquiring, from the application market using the application market server, latest version information of at least one application program that is corresponding to the hardware configuration information of the terminal devices, and establishing a correspondence between the hardware configuration information of the terminal devices and the latest version information of the application programs.

A third aspect of the embodiments of the present disclosure provides a method for implementing JAVA application program installation by cloud compilation, where the method may include acquiring, by an application market server, hardware configuration information of a terminal device and version information of a target application program that are sent by the terminal device, determining, by the application market server according to the hardware configuration information of the terminal device and a correspondence between hardware configuration information, stored in the application market server, of a terminal device and latest version information of the target application program, latest version information that is of the target application program and is corresponding to the hardware configuration information of the terminal device, determining, by the application market server according to the version information, sent by the terminal device, of the target application program, whether the version information is the latest version information, and if the version information is not the latest version information, sending upgrade information of the target application program to the terminal device, where the upgrade information includes a target code file that is corresponding to the latest version information of the target application program and that is obtained by compiling, on a cloud server, an intermediate code file corresponding to the version information of the target application program.

With reference to the third aspect, in a first possible implementation manner, after the acquiring, by an application market server, hardware configuration information of a terminal device and version information of a target application program that are sent by the terminal device, the method further includes sending, by the application market server, configuration information of the terminal device and an intermediate code file, stored in the application market server, of the target application program to the cloud server to compile the intermediate code file of the target application program according to the latest version information of the target application program using the cloud server, and obtain the target code file corresponding to the latest version information of the target application program.

A fourth aspect of the embodiments of the present disclosure provides a terminal device, where the terminal device may include a sending module configured to send hardware configuration information of the terminal device and version information of a target application program to an application market server to acquire, using the application market server, upgrade information that is of the target application program and is corresponding to the hardware configuration information and the version information of the target application program, a receiving module configured to receive the upgrade information, fed back by the application market server, of the target application program, where the upgrade information includes a target code file that is corresponding to latest version information of the target application program and that is obtained by compiling, on a cloud server, an intermediate code file corresponding to the version information of the target application program, and an installation module configured to perform optimized installation of the target application program according to the upgrade information received by the receiving module to update a version of the target application program.

With reference to the fourth aspect, in a first possible implementation manner, the receiving module is configured to receive an optimized installation package that is corresponding to the latest version information of the target application program and is sent by the application market server, where the optimized installation package is generated by packaging the target code file corresponding to the latest version information of the target application program, the target code file is obtained by the cloud server by compilation according to an intermediate code file corresponding to all functions included in the version information of the target application program, and the optimized installation package is stored in the application market server.

With reference to the first possible implementation manner of the fourth aspect, in a second possible implementation manner, the installation module is configured to re-install the target application program according to the optimized installation package received by the receiving module to update versions of all the functions of the target application program to latest versions.

With reference to the fourth aspect, in a third possible implementation manner, the receiving module is configured to receive an incremental upgrade package, sent by the application market server, of the target application program, where the incremental upgrade package is generated by packaging a target code file of latest version information of a specified function in the target application program, the target code file is obtained by the cloud server by compilation according to an intermediate code file corresponding to the specified function to be upgraded and optimized in the target application program, and the incremental upgrade package is stored in the application market server.

With reference to the third possible implementation manner of the fourth aspect, in a fourth possible implementation manner, the installation module is configured to converge the incremental upgrade package, received by the receiving module, of the target application program and an installation package corresponding to the version information of the target application program to generate an installation package that is of the target application program and includes the latest version information of the specified function, and re-install the target application program according to the installation package to update a version of the specified function of the target application program to a latest version.

A fifth aspect of the embodiments of the present disclosure provides a cloud server, where the cloud server may include an acquiring module configured to acquire hardware configuration information of a target terminal device and an intermediate code file of a built-in target application program of the target terminal device that are sent by an application market server, a judging module configured to determine, according to the hardware configuration information, acquired by the acquiring module, of the target terminal device and a correspondence between hardware configuration information, stored by the cloud server, of a terminal device and version information of an application program, whether a version of the built-in target application program of the target terminal device is a latest version, a compilation module configured to, when a determining result of the judging module is no, compile the intermediate code file of the target application program according to latest version information to obtain a target code file corresponding to the latest version information of the target application program, and a sending module configured to send the target code file, obtained by the compilation module by compilation, corresponding to the latest version information of the target application program to the application market server to send, using the application market server, the target code file corresponding to the latest version information of the target application program to the target terminal device.

With reference to the fifth aspect, in a first possible implementation manner, the judging module is configured to match the hardware configuration information, acquired by the acquiring module, of the target terminal device with hardware configuration information, stored by the cloud server, of various terminal devices, and determine whether the hardware configuration information of the target terminal device is any one piece of the hardware configuration information, stored by the cloud server, of the terminal devices, if the hardware configuration information of the target terminal device is any one piece of the hardware configuration information stored by the cloud server, determine, according to a correspondence between the hardware configuration information of the terminal devices and version information of application programs, latest version information that is of the target application program and is corresponding to the hardware configuration information of the target terminal device, and match version information of the built-in target application program of the target terminal device with the latest version information of the target application program to determine whether the version of the built-in target application program of the target terminal device is the latest version.

With reference to the fifth aspect, in a second possible implementation manner, the compilation module is configured to match version information of the built-in target application program of the target terminal device with the latest version information of the target application program, and determine upgrade information of a specified function that is newly added in the latest version information of the target application program, and compile, according to the upgrade information of the specified function, an intermediate code file included in an installation package of the built-in target application program of the target terminal to obtain the target code file that is corresponding to the latest version information of the target application program and includes latest version information of the specified function, and package the target code file to generate an optimized installation package corresponding to the latest version information of the target application program.

With reference to the fifth aspect, in a third possible implementation manner, the compilation module is configured to match version information of the built-in target application program of the target terminal device with the latest version information of the target application program, and determine upgrade information of a specified function that is newly added in the latest version information of the target application program, and compile, according to the upgrade information of the specified function, an intermediate code file corresponding to the specified function to generate a target code file corresponding to latest version information of the specified function, and package the target code file to generate an incremental upgrade package of the target application program.

With reference to any one of the fifth aspect to the third possible implementation manner of the second aspect, in a fourth possible implementation manner, the acquiring module is further configured to acquire hardware configuration information of at least one terminal device of at least one hardware configuration type from an application market using the application market server, acquire, from the application market using the application market server, latest version information of at least one application program that is corresponding to the hardware configuration information of the terminal devices, and establish a correspondence between the hardware configuration information of the terminal devices and the latest version information of the application programs.

A sixth aspect of the embodiments of the present disclosure provides an application market server, where the application market server may include an acquiring module configured to acquire hardware configuration information of a terminal device and version information of a target application program that are sent by the terminal device, a determining module configured to determine, according to the hardware configuration information, acquired by the acquiring module, of the terminal device and a correspondence between hardware configuration information, stored in the application market server, of a terminal device and latest version information of the target application program, latest version information that is of the target application program and is corresponding to the hardware configuration information of the terminal device, a judging module configured to determine, according to the version information, sent by the terminal device and acquired by the acquiring module, of the target application program, whether the version information is the latest version information, and a sending module configured to, when a determining result of the judging module is no, send upgrade information of the target application program to the terminal device, where the upgrade information includes a target code file that is corresponding to the latest version information of the target application program and that is obtained by compiling, on a cloud server, an intermediate code file corresponding to the version information of the target application program.

With reference to the sixth aspect, in a first possible implementation manner, the sending module is further configured to send configuration information of the terminal device and an intermediate code file, stored in the application market server, of the target application program to the cloud server to compile the intermediate code file of the target application program according to the latest version information of the target application program using the cloud server, and obtain the target code file corresponding to the latest version information of the target application program.

A seventh aspect of the embodiments of the present disclosure provides a system for implementing JAVA application program installation by cloud compilation, where the system may include the foregoing terminal device provided in the fourth aspect of the embodiments of the present disclosure, the cloud server provided in the fifth aspect of the embodiments of the present disclosure, and the application market server provided in the sixth aspect.

In the embodiments of the present disclosure, a terminal device may send hardware configuration information of the terminal device and version information of a target application program currently installed on the terminal device to an application market server to obtain, by the application market server by matching, latest version information that is of the foregoing target application program and is corresponding to the hardware configuration information of the terminal device. The terminal device may receive upgrade information, sent by the application market server, of the target application program, and further, may perform optimized installation of the target application program according to the foregoing upgrade information, and update the target application program on the terminal device by installing an optimized application program (that is, an application program of a latest version) such that the target application program reaches the latest version. In the embodiments of the present disclosure, a process of obtaining a target code file corresponding to latest version information by compiling an intermediate code file corresponding to current version information of a target application program is performed on a cloud market server, and a terminal device does not need to perform compilation for upgrade and optimization of an application program on the device, which reduces running memory and storage space of the terminal device that are occupied for the upgrade and optimization of the application program, improves efficiency of optimized installation of the application program, and enhances user experience of the terminal device.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
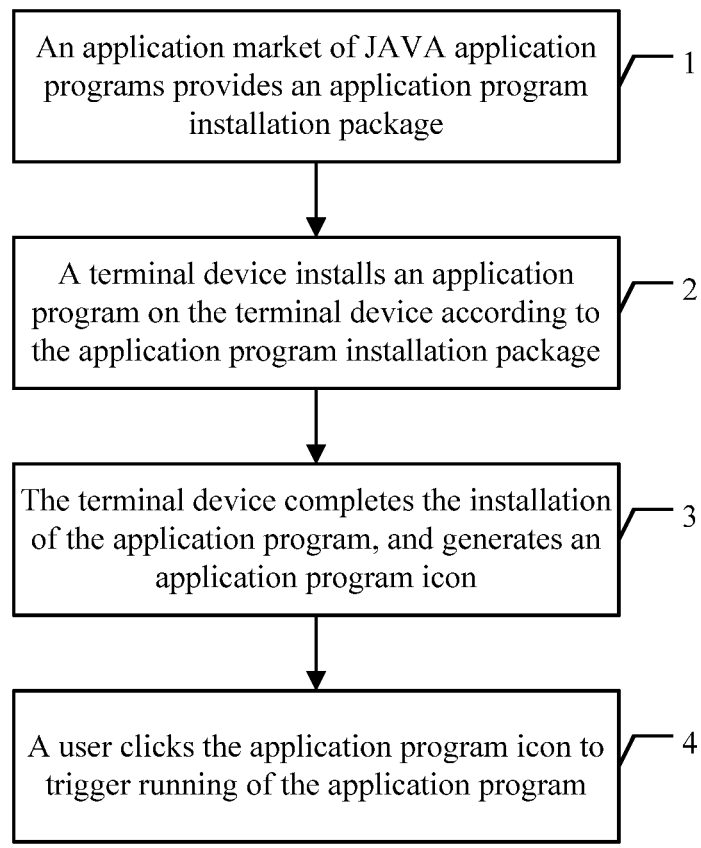
FIG. 1 is a schematic flowchart of a method for installing a JAVA application program in the prior art.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Introduction to basic knowledge of JAVA:

JAVA is an object-oriented program design language for writing cross-platform application software. A JAVA technology has excellent commonality, high efficiency, platform portability, and security, and is widely applied to personal PCs, data centers, game consoles, scientific supercomputers, mobile telephones, and the Internet. In addition, the JAVA technology has a globally largest professional developer community.

JAVA is a general name of a JAVA object-oriented program design language (hereinafter referred to as a JAVA language) and a JAVA platform that are launched by Sun Microsystems. JAVA is researched and developed by James Gosling and colleagues, and was officially launched in 1995. JAVA was initially referred to as OAK, which was designed in 1991 for embedded chips of consumer electronic products. OAK was renamed JAVA in 1995, and was re-designed for developing Internet application programs. Hot JAVA browsers (supporting a JAVA applet) implemented using JAVA show charm of JAVA cross platform, dynamic Web, and Internet computing. From then on, JAVA has been widely accepted and pushes the rapid development of Web. Commonly used browsers all support a JAVA applet. In addition, the JAVA technology is also constantly updated. JAVA has been very popular since its emergence, and develops rapidly, bringing strong impact to the C++® language. In an industry environment of global cloud computing and mobile Internet, JAVA has remarkable advantages and broad prospects. At present, a most popular mobile platform ANDROID system uses JAVA as a development language.

JAVA mainly includes four parts:

a JAVA programming language, mainly involving a JAVA programming syntax, a JAVA file format, mainly including JAVA directories, files, suffixes, and the like, a JAVA application programming interface, and a JAVA virtual machine, mainly including modules for compilation optimization, loading, interpretation, running, management, and the like of JAVA bytecode.

A runtime environment stands for a JAVA platform. A developer writes JAVA code (a .JAVA file), and then compiles the JAVA code into bytecode (a .class file). Finally, the bytecode is loaded to an internal memory. Once the bytecode enters a virtual machine, the bytecode is interpreted and executed by an interpreter, or is selectively converted into machine code by an instant code generator and executed. A JAVA platform is built using a JAVA virtual machine and a JAVA application programming interface. The JAVA language is a channel for accessing the platform. A program that is written and compiled using the JAVA language can run on the platform. A system architecture of the platform is shown in Table 1:

TABLE 1

| Application program and applet | |
|---|---|
| Basic JAVA application programming interface (API) | Standard extended JAVA API |
| JAVA base class | Standard extended JAVA class |

TABLE 1-continued

| | JAVA virtual machine Porting interface | | |
|---|---|---|---|
| Adapter Browser Operating system Hardware JAVA on a browser | Adapter Operating system Hardware JAVA on a desktop operating system | Adapter Operating system Hardware JAVA on a small operating system | JAVA operating system Hardware JAVA of a JAVA operating system |

In the structure of the JAVA platform shown in Table 1, it can be seen that the JAVA virtual machine is at a core position, and is a key of a program's independence of a bottom-layer operating system and hardware. Below the JAVA virtual machine is the porting interface. The porting interface includes two parts: an adapter and a JAVA operating system, where a part depending on the platform is referred to as an adapter. The JAVA virtual machine is implemented on a specific platform and operating system by the porting interface. Above the JAVA virtual machine is a basic class library, an extended class library of JAVA, and their APIs. An application program (application) and an applet (JAVA applet) that are written using the JAVA API can run on any JAVA platform, without considering a bottom-layer platform, which is because the Java virtual machine implements separation of a program from an operating system, thereby implementing platform independence of JAVA.

In specific implementation, to better describe the method for implementing JAVA application program installation by cloud compilation provided in the embodiments of the present disclosure, the following describes a manner for installing a JAVA application program in the prior art with reference to FIG. 1.

Refer to FIG. 1, which is a schematic flowchart of a method for installing a JAVA application program in the prior art. The method for installing a JAVA application program in the prior art includes the following steps shown in FIG. 1.

1. An application market of JAVA application programs provides an application program installation package.

2. A terminal device installs an application program on the terminal device according to the application program installation package.

3. The terminal device completes the installation of the application program, and generates an application program icon.

4. A user clicks the application program icon to trigger running of the application program.

The terminal device downloads, from the JAVA application program market, an installation package of a specified JAVA application program to the device, and decompresses the installation package to obtain a *.class file of the application program. The terminal device parses the *.class file to obtain a *.dex file of the application program, scans and extracts DEX bytecode according to the *.dex file, performs, according to hardware configuration information of the terminal device, transcoding compilation to obtain an *.oat file in a format of local machine code, and finally generates an application program icon to complete installation of the application program. When a user clicks the application program icon, the terminal device can enable, using a JAVA running engine, the JAVA application program to work normally.

In the prior art, in a process of installing an application program, if a terminal device needs to improve a startup speed of the application program, the application program needs to be optimized. In this case, the terminal device needs to copy and load a local method class library and a general method class library that are related to the optimization of the application program to an internal memory of the terminal device, and optimized installation is performed on the application program using a compilation optimization module of the terminal device, which occupies memory of the terminal device. In addition, limited running memory of the terminal device also prolongs time of the optimized installation of the application program, and installation efficiency is low.

In addition, JAVA is also used to develop application programs for existing ANDROID platforms in the terminal field. Compared with an original JAVA platform, some differences lie in installation and running processes of a JAVA application program of ANDROID. An ANDROID virtual machine has a different running policy from an original JAVA virtual machine (the original JAVA virtual machine runs in stack mode, and the ANDROID virtual machine runs in a register mode). Therefore, in a process of installing a JAVA application program of ANDROID, after a terminal device downloads an ANDROID installation package to a device, in addition to decompressing an *.apk file and scanning a *.dex file, the terminal device further needs to perform binary compilation optimization for hardware configuration information of the terminal device, saves optimized bytecode as an *.odex file, and saves the *.odex file in a system. When a user clicks an application program icon to trigger running of the application program, the terminal device directly copies and loads the *.odex file and a related method and class library to an internal memory such that performance is improved during running of the JAVA application program.

In addition, to promote running performance of a JAVA application program and improve a JAVA virtual machine of an ANDROID platform, an ANDROID Run Time (ART) virtual machine is used by default in ANDROID version 5.0 to replace a DALVIK virtual machine used in an earlier version. The use of an ART virtual machine nearly doubles running performance of an application program, but also prolongs installation time of a JAVA application program. When installing an application program in an ART virtual machine, a terminal device may first download an *.apk file of the application program from an application market and obtain a *.dex file by decompression, then perform bytecode scanning and extraction, and further perform transcoding optimization according to specific information of the current device to obtain an *.oat file in a format of local machine code. Before the *.oat file is obtained by transcoding, a compilation optimization module of the terminal device needs to be invoked to perform optimization on the *.dex file according to a current hardware situation such that performance is remarkably promoted during subsequent running of the application program.

In summary, in the prior art, when a terminal device installs an application program, it takes some time to scan and optimize JAVA bytecode. In addition, for a platform like an ART virtual machine, during program installation, an Ahead-of-time (AoT) compilation technology needs to be further used to perform pertinent compilation optimization according to hardware configuration information of the terminal device. Although performance is remarkably promoted during subsequent program running, optimized compilation of the application program needs to be performed on the terminal device, which increases local storage of the terminal device (that is, occupies local storage space of the terminal device), prolongs installation time of the application program, and compromises user experience of the terminal device.

In the embodiments of the present disclosure, local storage space is occupied due to optimized compilation of a stored application program, and installation time of an application program is prolonged, a cloud server is used to implement in advance transcoding optimization of intermediate code such as a *.dex file of an ART virtual machine of a terminal device such that the terminal device directly obtains, from the cloud server, a file obtained by transcoding optimization to install an application program, which shortens time of installing the application program by the terminal device, and enhances user experience of application program installation.

Figure 2:
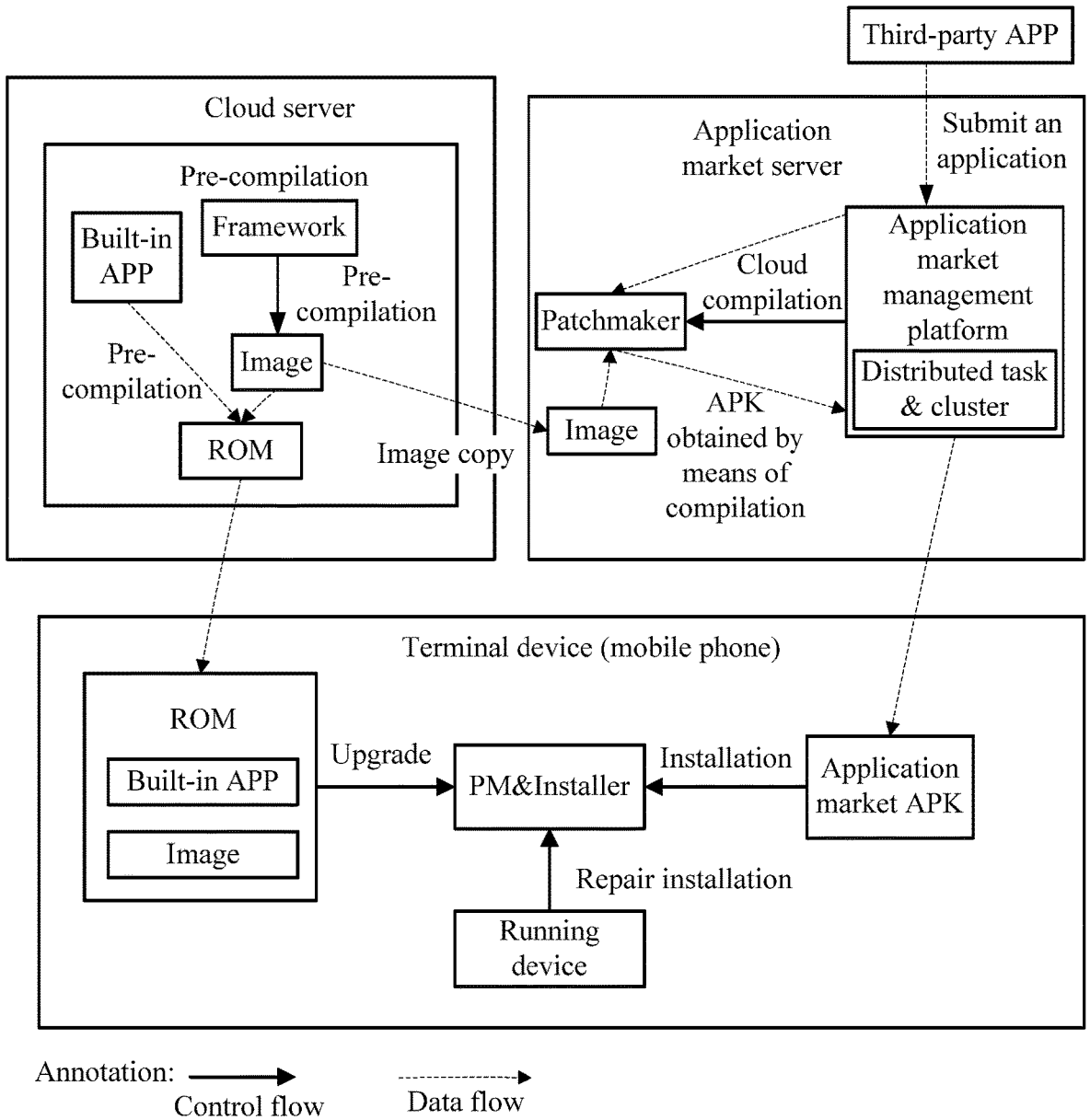
FIG. 2 is a diagram of an architecture of a cloud compilation system for implementing JAVA application installation by cloud compilation according to an embodiment of the present disclosure.

The described scheme for implementing JAVA application program installation by cloud compilation in the embodiments of the present disclosure mainly involves three apparatuses: an application market server, a compilation server (also referred to as a cloud server), and a terminal device. Different policies may be used for a built-in application and a third-party application of a known device to implement that performance of a JAVA application downloaded from a specific application market is remarkably improved for a specific device, thereby implementing differential competitiveness. A system architecture for the implementation is shown in FIG. 2.

On a cloud server, for a specific hardware device, optimized compilation is performed on a corresponding built-in application (that is, a built-in application), an original *.dex file generated by compilation by an ANDROID platform is further optimized into an *.oat file, and *.apk is finally generated by packaging. In addition, the *.apk file is copied and stored to a database corresponding to a specific hardware device on a market server, to facilitate subsequent download and use by a device corresponding to hardware. In addition, when the *.apk file is installed on a device, the cloud server has optimized the *.dex file into the *.oat in advance. Therefore, during the installation, a virtual machine module of a terminal device does not need to perform optimization again, which can greatly save time. In addition, a program manager may establish a link with the market server anytime by network communication and check whether a version of a current application is a latest version, thereby ensuring that an application running on a device is a latest version. When a developer submits an application to the market server for release, while scanning and auditing the application, the server performs optimized compilation on a *.dex file of the application using a patchmaker compiler, performs transcoding to obtain an *.oat file, obtains *.apk by re-packaging, and then releases the *.apk in the application market, facilitating subsequent download and use by a device. After establishing a link with the market server using a program manager of a terminal device, the terminal device notifies the market server of information of an existing application of the terminal device and hardware information of the terminal device such that the market server performs query according to the hardware and application information of the terminal device, to see whether the application of the terminal device can be updated or upgraded.

With reference to FIG. 3 through FIG. 13, the following describes, from perspectives of a terminal device and a cloud server, the method, apparatus, and system for implementing JAVA application program installation by cloud compilation provided in the embodiments of the present disclosure.

In specific implementation, the terminal device described in the embodiments of the present disclosure may be a mobile phone, a tablet computer, a personal computer assistant, a notebook computer, or the like. The foregoing terminal device is merely an example and not exhaustively enumerated, including but not limited to the foregoing device, which is not limited herein. The following provides specific description using a mobile phone as an example.

Figure 3:
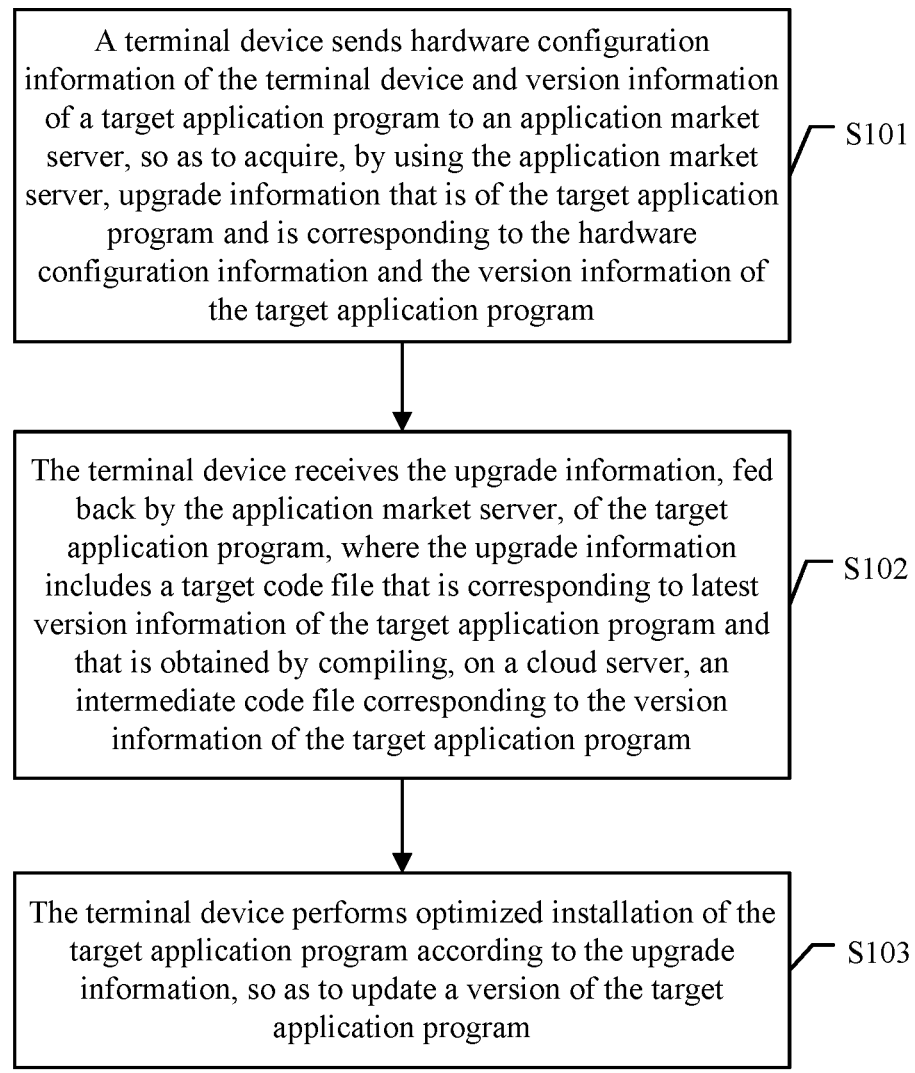
FIG. 3 is a schematic flowchart of a first embodiment of a method for implementing JAVA application installation by cloud compilation according to an embodiment of the present disclosure.

Refer to FIG. 3, which is a schematic flowchart of a first embodiment of a method for implementing JAVA application program installation by cloud compilation according to an embodiment of the present disclosure. The method described in this embodiment of the present disclosure includes the following steps.

S101: A terminal device sends hardware configuration information of the terminal device and version information of a target application program to an application market server to acquire, using the application market server, upgrade information that is of the target application program and is corresponding to the hardware configuration information and the version information of the target application program.

In specific implementation, in this embodiment of the present disclosure, the method for implementing JAVA application program installation by cloud compilation provided in this embodiment of the present disclosure is first described from a perspective of a terminal device (the following uses a mobile phone as an example for description).

In some feasible implementation manners, during startup, a mobile phone may establish a communication link with an application market server to acquire, from the application market server, latest version information of a target application program, or an optimized installation file of a target application program on which optimization has been completed. After establishing the communication link with the application market server, the mobile phone may send, to the application market server, current hardware configuration information of the mobile phone and version information of a target application program currently installed in the mobile phone (that is, a to-be-optimized target application program, for example, to-be-optimized instant messaging software). The foregoing application market server may be a management service platform corresponding to an application market of the mobile phone. The application market server may learn latest version information of various application programs included in the application market, or may communicate with a cloud server to compile an intermediate code file (for example, a *.dex file) of the target application program using the cloud server to obtain an optimized target code file (for example, an *.oat file) corresponding to the latest version information of the target application program. After sending the hardware configuration information of the mobile phone and the version information of the target application program to the application market server, the mobile phone may acquire upgrade information of the target application program or the latest version information of the target application program using the application market server. In specific implementation, the foregoing *.dex file or *.oat file is intermediate code involved during upgrade of an application program. That is, in specific implementation, program upgrade of a JAVA platform or an ANDROID platform may be classified into native program upgrade, or program upgrade with intermediate code. The platform described in this embodiment of the present disclosure may further include an iOS® platform, a WINDOWS phone platform, or the like, which is not limited herein. The following provides specific description using an ANDROID platform with intermediate code as an example. The foregoing intermediate code may include a *.dex file, an *.oat file, or the like of an application program, which is not limited herein.

In specific implementation, the described hardware configuration information of the mobile phone in this embodiment of the present disclosure may include model information of the mobile phone, system version information of the mobile phone, hardware interface information of the mobile phone, or the like. The foregoing hardware configuration information of the mobile phone is alternatively referred to as a hardware environment of the mobile phone. The foregoing hardware configuration information is merely an example and not exhaustively enumerated, including but not limited to the foregoing information, which is not limited herein.

S102: The terminal device receives the upgrade information, fed back by the application market server, of the target application program, where the upgrade information includes a target code file that is corresponding to latest version information of the target application program and that is obtained by compiling, on a cloud server, an intermediate code file corresponding to the version information of the target application program.

In specific implementation, after the mobile phone sends the hardware configuration information of the mobile phone and the version information of the target application program to the application market server, the application market server may perform matching according to the hardware configuration information sent by the mobile phone and with reference to hardware configuration information, stored in a database of the application market server, of a terminal device, and obtain, by search in the database, data that is the same as the hardware configuration information sent by the mobile phone, and further, may determine, according to a correspondence between the hardware configuration information stored in the database and version information of an application program of the mobile phone, latest version information that is of the target application program and is corresponding to the current hardware configuration information (hereinafter referred to as a mobile phone configuration) sent by the mobile phone.

In some feasible implementation manners, after obtaining, by search in the database of the application market server, the latest version information that is of the target application program and is corresponding to the current mobile phone configuration, the application market server may compare the latest version information with the version information sent by the mobile phone, and determine whether the version information sent by the mobile phone is the latest version information. If the version information sent by the mobile phone is not the latest version information, upgrade information for application program optimization that is required to upgrade and optimize a current version may be fed back to the mobile phone. The mobile phone may receive the upgrade information, fed back by the application market server, of the target application program. The foregoing upgrade information may include an optimized target code file (for example, an *.oat file) that is corresponding to the latest version information of the target application program and that is obtained by compiling an intermediate code file (for example, a *.dex file) corresponding to the version information of the target application program (that is, a current version of the target application program installed on the mobile phone). In specific implementation, the mobile phone may acquire, using the application market server, the optimized *.oat file, obtained by the cloud server by pre-compilation, of the target application program. The foregoing optimized *.oat file of the target application program is a target code file, obtained by pre-compilation by the cloud server and stored in the application market server, of the target application program. A terminal device may directly acquire the *.oat file from the application market server. The terminal device may also directly establish a connection with the cloud server, and download, from the cloud server, the foregoing optimized *.oat file, obtained by pre-compilation by the cloud server, of the target application program. A specific implementation manner may be determined according to a communication link relationship between the mobile phone, the cloud server, and the application market server, which is not limited herein.

It should be noted that, in this embodiment of the present disclosure, the terminal device may also send, to the cloud server in real time using the application market server, mobile phone configurations to be optimized and upgraded, and version information of target application programs corresponding to the mobile phone configurations. The target application programs corresponding to the mobile phone configurations are compiled in real time using the cloud server to obtain an optimized target code file corresponding to latest version information of the target application programs. The cloud server may further compile an original *.dex file that is generated by local compilation on the ANDROID platform, into an *.oat file. An optimization algorithm is added in a compilation process to obtain, by compilation, the optimized target code file (which is an *.oat file) of the target application programs. Finally, an *.apk file of the target application programs is obtained by packaging according to the *.oat file. After the *.apk file is obtained by packaging, the cloud server may copy and store the *.apk file to databases corresponding to the mobile phone configurations on the application market server for the mobile phone to download and use.

S103. The terminal device performs optimized installation of the target application program according to the upgrade information to update a version of the target application program.

In some feasible implementation manners, after acquiring the upgrade information fed back by the application market server, the mobile phone may perform optimized installation of the target application program according to the foregoing upgrade information, and update an existing version of the target application program on the mobile phone. In specific implementation, the described upgrade information of the target application program in this embodiment of the present disclosure may be an optimized application program *.apk file that is of the target application program and that may be generated by packaging an optimized *.oat file, where the *.oat file is obtained by the cloud server by compiling a *.dex file, generated by compilation on the ANDROID platform, of the target application program. The mobile phone may perform optimized installation of an application program according to the foregoing *.apk file, and update an existing application program version in the mobile phone.

In this embodiment of the present disclosure, a mobile phone may send hardware configuration information of the mobile phone and version information of a target application program currently installed on the mobile phone to an application market server to obtain, by the application market server by matching, latest version information that is of the target application program and is corresponding to the hardware configuration information of the mobile phone. The mobile phone may receive upgrade information, sent by the application market server, of the target application program, and further, may perform optimized installation of the target application program according to the foregoing upgrade information, and update the target application program on the terminal device by installing an optimized application program (that is, an application program of a latest version) such that the target application program reaches the latest version. In this embodiment of the present disclosure, a process of obtaining a target code file corresponding to latest version information by compiling an intermediate code file corresponding to current version information of a target application program is performed on a cloud market server, and a terminal device does not need to perform compilation for upgrade and optimization of an application program on the device, which reduces running memory and storage space of a mobile phone that are occupied for upgrade and optimization of an application program, improves efficiency of optimized installation of the application program, and enhances user experience of the mobile phone. By fast application installation, users who originally perform installation on another network are attracted to download applications from the application market described in this embodiment of the present disclosure for installation.

Figure 4:
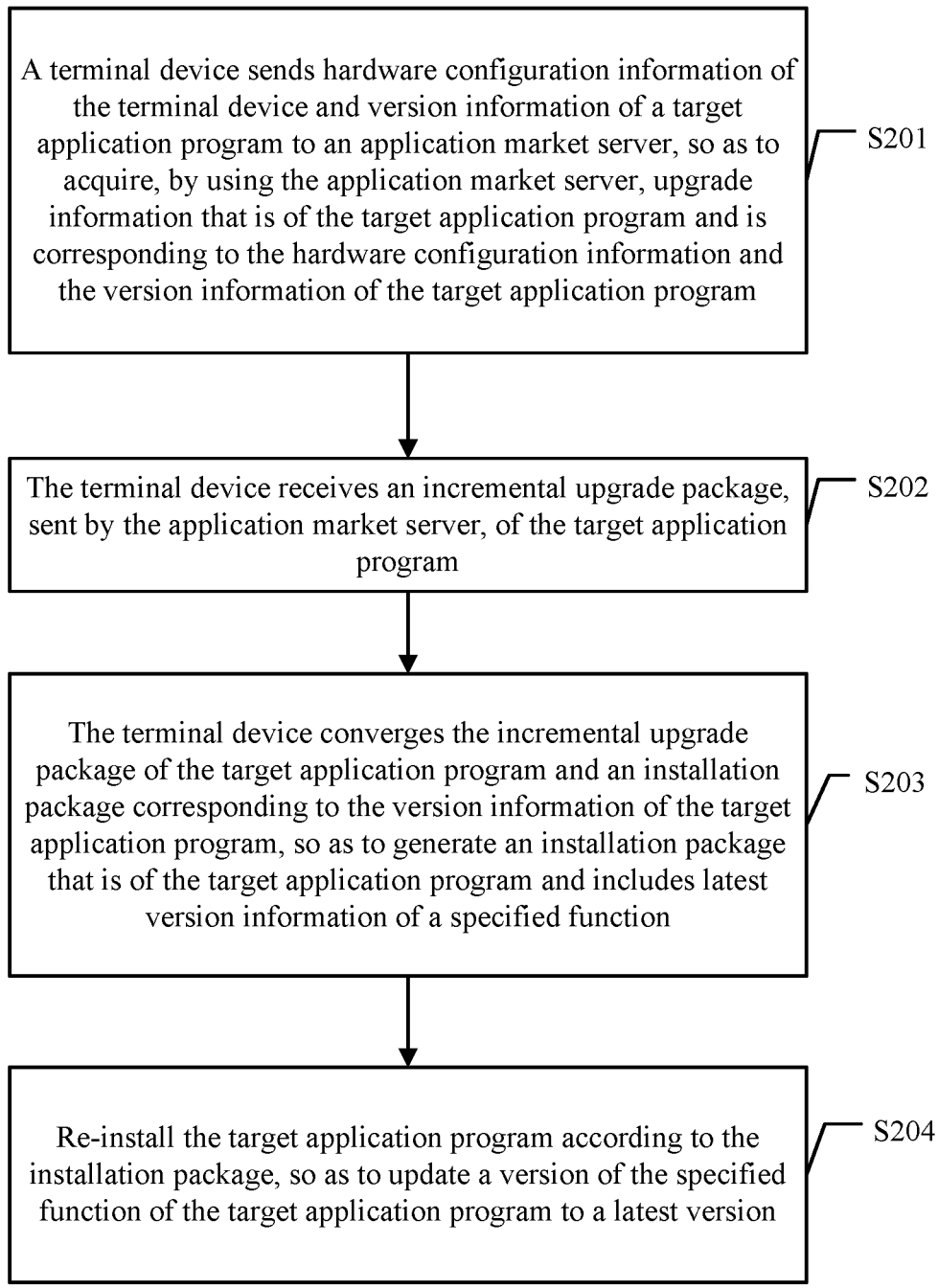
FIG. 4 is a schematic flowchart of a second embodiment of a method for implementing JAVA application installation by cloud compilation according to an embodiment of the present disclosure.

Refer to FIG. 4, which is a schematic flowchart of a second embodiment of a method for implementing JAVA application program installation by cloud compilation according to an embodiment of the present disclosure. The method described in this embodiment of the present disclosure includes the following steps.

S201. A terminal device sends hardware configuration information of the terminal device and version information of a target application program to an application market server to acquire, using the application market server, upgrade information that is of the target application program and is corresponding to the hardware configuration information and the version information of the target application program.

In specific implementation, for a specific implementation process of sending hardware configuration information of a mobile phone and version information of a target application program to an application market server by the mobile phone, reference may be made to the implementation manner described in step S101 in the foregoing first embodiment, and details are not described herein again.

S202. The terminal device receives an incremental upgrade package, sent by the application market server, of the target application program, where the incremental upgrade package is generated by packaging a target code file of latest version information of a specified function in the target application program, the target code file is obtained by a cloud server by compilation according to an intermediate code file corresponding to the specified function to be upgraded and optimized in the target application program, and the incremental upgrade package is stored in the application market server.

In some feasible implementation manners, upgrade information, fed back by the application market server and received by the mobile phone, of the target application program may be an optimized installation package (APK) corresponding to latest version information of the target application program. The mobile phone may receive the optimized APK that is corresponding to the latest version information of the target application program and is sent by the application market server. The foregoing optimized installation package is generated by packaging a target code file corresponding to the latest version information of the target application program, the foregoing target code file is obtained by the cloud server by compilation according to an intermediate code file corresponding to all functions included in current version information of the target application program installed on the mobile phone, and the foregoing optimized installation package is stored in the application market server. After acquiring the foregoing optimized installation package, the mobile phone re-installs the foregoing target application program according to the foregoing optimized installation package, and updates versions of all the functions of the foregoing target application program to latest versions. In specific implementation, for specific implementation processes of acquiring, by the mobile phone, the foregoing optimized APK and performing optimized installation of the target application program according to the foregoing optimized APK, reference may be made to the implementation manners described in steps S102 and S103 in the foregoing first embodiment, and details are not described herein again.

Further, the upgrade information, sent by the application market server and received by the mobile phone, of the target application program may further be an incremental upgrade package of the target application program. The foregoing incremental upgrade package is generated by packaging a target code file of latest version information of a specified function in the foregoing target application program. The foregoing target code file is obtained by the foregoing cloud server by compilation according to an intermediate code file corresponding to the specified function to be upgraded and optimized in the foregoing target application program. The foregoing incremental upgrade package is stored in the application market server. For example, when a third-party developer needs to upgrade an application program that is released by the third-party developer on the application market provided in this embodiment of the present disclosure, APK, obtained by local compilation, of the developer may be submitted to the application market server provided in this embodiment of the present disclosure (that is, a management platform of the application market described in this embodiment of the present disclosure). The application market server may compare latest version information, sent by the third-party developer, of the target application program with existing version information in the application market, and determine a specified function to be upgraded and optimized. The cloud server may determine, by comparing the latest version information with the existing version information, upgrade information of a specified function that is newly added in a latest version, and further, may perform compilation optimization on a *.dex file of the target application program by optimized incremental compilation using the cloud server, obtain a latest version of an *.oat file of the target application program, and then perform packaging to form new APK and an incremental upgrade package. The application market server may release the new APK and the incremental upgrade package that are obtained by optimization by the cloud server to the application market for the mobile phone to download and use. The mobile phone establishes a communication connection with the application market server. After sending the hardware configuration information of the mobile phone and the version information of the target application program, the mobile phone may acquire, on the application market using the application market server, the incremental upgrade package of the target application program.

S203: The terminal device converges the incremental upgrade package of the target application program and an installation package corresponding to the version information of the target application program to generate an installation package that is of the target application program and includes the latest version information of the specified function.

S204: Re-install the target application program according to the installation package to update a version of the specified function of the target application program to a latest version.

In specific implementation, after acquiring the incremental upgrade package of the target application program, the mobile phone may converge the incremental upgrade package and an existing APK file of the target application program of the mobile phone, and generate an installation package that includes the target application program corresponding to the latest version information of the specified function, that is, a new optimized APK file. The mobile phone may perform optimized installation of the target application program according to the foregoing optimized APK file. The mobile phone does not need to execute an AoT compilation optimization process in a process of installing the target application program, thereby saving time for installing an application program. In specific implementation, for a specific process of installing, by the mobile phone, an optimized application program according to the upgrade information of the target application program to update a version of the target application program, reference may be made to the implementation manner described in step S103 in the foregoing first embodiment, and details are not described herein again.

In this embodiment of the present disclosure, a mobile phone may send hardware configuration information of the mobile phone and version information of a target application program currently installed on the mobile phone to an application market server to obtain, by the application market server by matching, latest version information that is of the target application program and is corresponding to the hardware configuration information of the mobile phone. The mobile phone may receive an incremental upgrade package, sent by the application market server, of the target application program, converge the foregoing incremental upgrade package of an optimized application program and existing APK of the target application program to obtain optimized APK, install the optimized application program according to the optimized APK, and update the target application program on the mobile phone by installing the optimized application program such that the target application program reaches a latest version. In this embodiment of the present disclosure, compilation optimization for upgrade of a target application program is performed on a cloud server, and a mobile phone does not need to perform upgrade and optimization of an application program on the device, which reduces running memory and storage space of the mobile phone that are occupied for the upgrade and optimization of the application program, improves efficiency of the optimization of the application program, and enhances user experience of the mobile phone.

Figure 5:
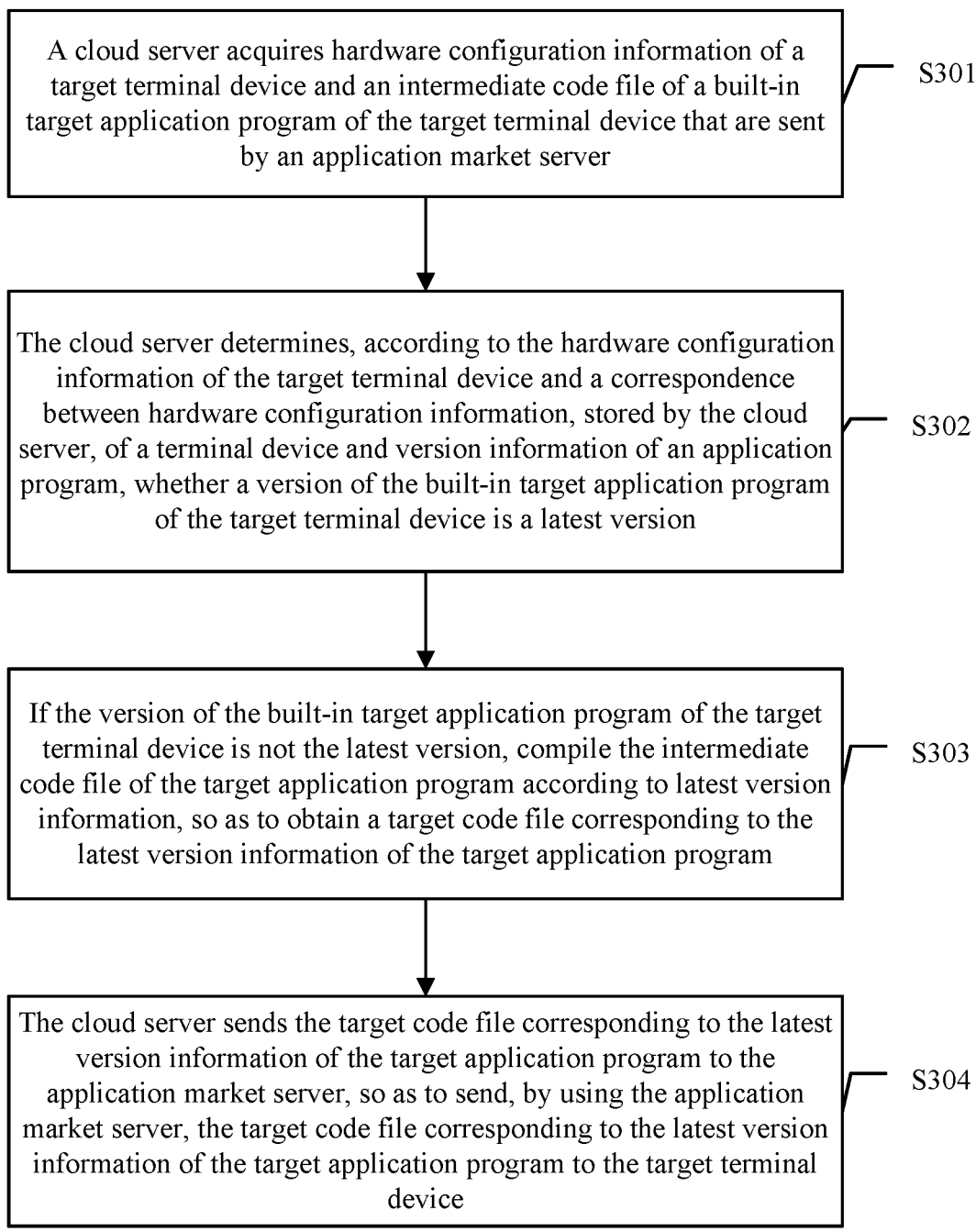
FIG. 5 is a schematic flowchart of a third embodiment of a method for implementing JAVA application installation by cloud compilation according to an embodiment of the present disclosure.

Refer to FIG. 5, which is a schematic flowchart of a third embodiment of a method for implementing JAVA application program installation by cloud compilation according to an embodiment of the present disclosure. The method described in this embodiment of the present disclosure includes the following steps.

S301: A cloud server acquires hardware configuration information of a target terminal device and an intermediate code file of a built-in target application program of the target terminal device that are sent by an application market server.

In specific implementation, the following describes, from a perspective of a cloud server, how the cloud server directly or indirectly communicates with an application market server and a mobile phone, and implements JAVA application program installation by cloud compilation. The following describes, using a cloud server as an execution body, the provided method for implementing JAVA application program installation by cloud compilation in this embodiment of the present disclosure.

In some feasible implementation manners, the cloud server may first acquire, from an application market using the application market server, hardware configuration information of multiple mobile phones corresponding to multiple hardware configuration types. For example, the cloud server may acquire, from the application market, hardware configuration information of a mobile phone 1 having first hardware configuration information, or acquire, from the application market, hardware configuration information of a mobile phone 2 having second hardware configuration information. After acquiring the hardware configuration information of the mobile phones, the cloud server may acquire, from the application market server, latest version information of one or more application programs that is corresponding to the hardware configuration information of the mobile phones, and may further establish a correspondence between the hardware configuration information of the mobile phones and the latest version information of the application programs of the mobile phones. After the cloud server establishes the correspondence between the hardware configuration information of the mobile phones and the latest version information of the application programs of the mobile phones, if a mobile phone acquires hardware configuration information of any one mobile phone, latest version information of an application program corresponding to the mobile phone may be determined according to the hardware configuration information of the mobile phone, and further, it may be determined, according to version information of an existing built-in application program of the mobile phone, whether to update a version of the built-in application program of the mobile phone.

In some feasible implementation manners, the cloud server may establish a communication connection with the application market server to acquire, using the application market server, version information of a target application program and hardware configuration information of a mobile phone that are sent by the mobile phone, or may acquire, using the application market server, latest version information of a target terminal application, a locally compiled file of an installation file of the target application, and the like. In specific implementation, the cloud server may acquire the hardware configuration information of the mobile phone from the application market server. A to-be-optimized file of a built-in target application program of the mobile phone may also be acquired from the cloud server. The foregoing to-be-optimized file may be a *.dex file. Further, optimization compilation may be performed on the acquired *.dex file to obtain an *.oat file for the mobile phone to perform optimized installation.

S302: The cloud server determines, according to hardware configuration information of the target terminal device and a correspondence between hardware configuration information, stored by the cloud server, of a terminal device and version information of an application program, whether a version of the built-in target application program of the target terminal device is a latest version.

In some feasible implementation manners, after acquiring the hardware configuration information of the mobile phone using the application market server, the cloud server may match the acquired hardware configuration information of the mobile phone with pre-stored hardware configuration information of various mobile phones according to a correspondence, pre-established by the cloud server, between hardware configuration information of a mobile phone and version information of an application program of a mobile phone, and determine a latest version that is of a target application program and is corresponding to the acquired hardware configuration information of the mobile phone. After acquiring latest version information that is of the target application program and is corresponding to the hardware configuration information of the mobile phone, the cloud server may compare current version information, acquired from the application market server, of a built-in application program of the mobile phone with the foregoing latest version information, determine whether a version of the foregoing built-in application program of the mobile phone is the latest version, and further determine whether the version of the built-in application program of the mobile phone needs to be updated.

S303: If the version of the built-in target application program of the target terminal device is not the latest version, compile the intermediate code file of the target application program according to latest version information to obtain a target code file corresponding to the latest version information of the target application program.

S304: The cloud server sends the target code file corresponding to the latest version information of the target application program to the application market server to send, using the application market server, the target code file corresponding to the latest version information of the target application program to the target terminal device.

In some feasible implementation manners, if determining that a version of a built-in target application program of the mobile phone is not a latest version, the cloud server may perform compilation optimization on an intermediate code file (which may be a *.dex file), obtained by the mobile phone by local compilation, of the target application program according to latest version information to obtain a target code file (which may be an *.oat file) corresponding to the latest version information of the target application program. In specific implementation, the cloud server may match version information, acquired from the application market server, of the built-in target application program of the mobile phone with the latest version information, stored in the cloud server, of the target application program, and determine upgrade information of a specified function that is newly added in the latest version information of the target application program. After determining the upgrade information of the specified function that is newly added in the latest version information of the target application program, the cloud server may perform, according to the foregoing upgrade information, compilation optimization on a *.dex file included in APK of the built-in target application program of the mobile phone to obtain a target code file (for example, an *.oat file) corresponding to latest version information of all functions of the target application program, and further, may package the foregoing *.oat file to generate a latest version of APK of the target application program. After obtaining the *.oat file of the target application program by performing compilation optimization on the *.dex file, obtained by the mobile phone by local compilation, of the target application program, the cloud server may package the foregoing *.oat file to generate the APK file, and send the APK file to the application market server. The APK file is stored in specified storage space on the application market server for the mobile phone to download and install.

In some feasible implementation manners, the cloud server may also match version information of a built-in target application program of the mobile phone with latest version information of the target application program, and determine upgrade information of a specified function that is newly added in a latest version. Further, the cloud server may acquire a *.dex file, obtained by the mobile phone by local compilation, of the target application program, and further, may perform compilation optimization on a *.dex file corresponding to the specified function to generate an *.oat file corresponding to the specified function, and package the generated *.oat file to generate an incremental upgrade package of the target application program. Further, the cloud server may send the incremental upgrade package, generated by packaging the foregoing *.oat file, of the target application program to the application market server. The incremental upgrade package is stored in specified storage space on the application market server for the mobile phone to download and install. The mobile phone may download the foregoing incremental upgrade package from the application market server, converge the incremental upgrade package and APK generated by the mobile phone by local compilation to form a latest version of APK of the target application program, and update the target application program by installing the foregoing APK.

In this embodiment of the present disclosure, a cloud server may acquire, using an application market server, hardware configuration information of a mobile phone and version information of a target application program currently installed on the mobile phone, and further, may determine, according to latest version information, pre-stored in the cloud server, of the target application program, whether to update a version of the target application program installed on the mobile phone. If the version of the target application program needs to be updated, optimized compilation may be performed on a *.dex file obtained by the mobile phone by local compilation, to obtain optimized APK of the target application program or an incremental upgrade package. Further, the foregoing optimized APK or the incremental upgrade package may be sent to the application market server for the mobile phone to download and install. In this embodiment of the present disclosure, compilation optimization for upgrade of a target application program is performed on a cloud server, and a mobile phone does not need to perform upgrade and optimization of an application program on the device, which reduces running memory and storage space of the mobile phone that are occupied for the upgrade and optimization of the application program, improves efficiency of the optimization of the application program, and enhances user experience of the mobile phone. In this embodiment of the present disclosure, by, for example, sufficient optimization time of cloud compilation, application developers having high performance requirements are attracted to mount application programs on the application market described in this embodiment of the present disclosure.

Figure 6:
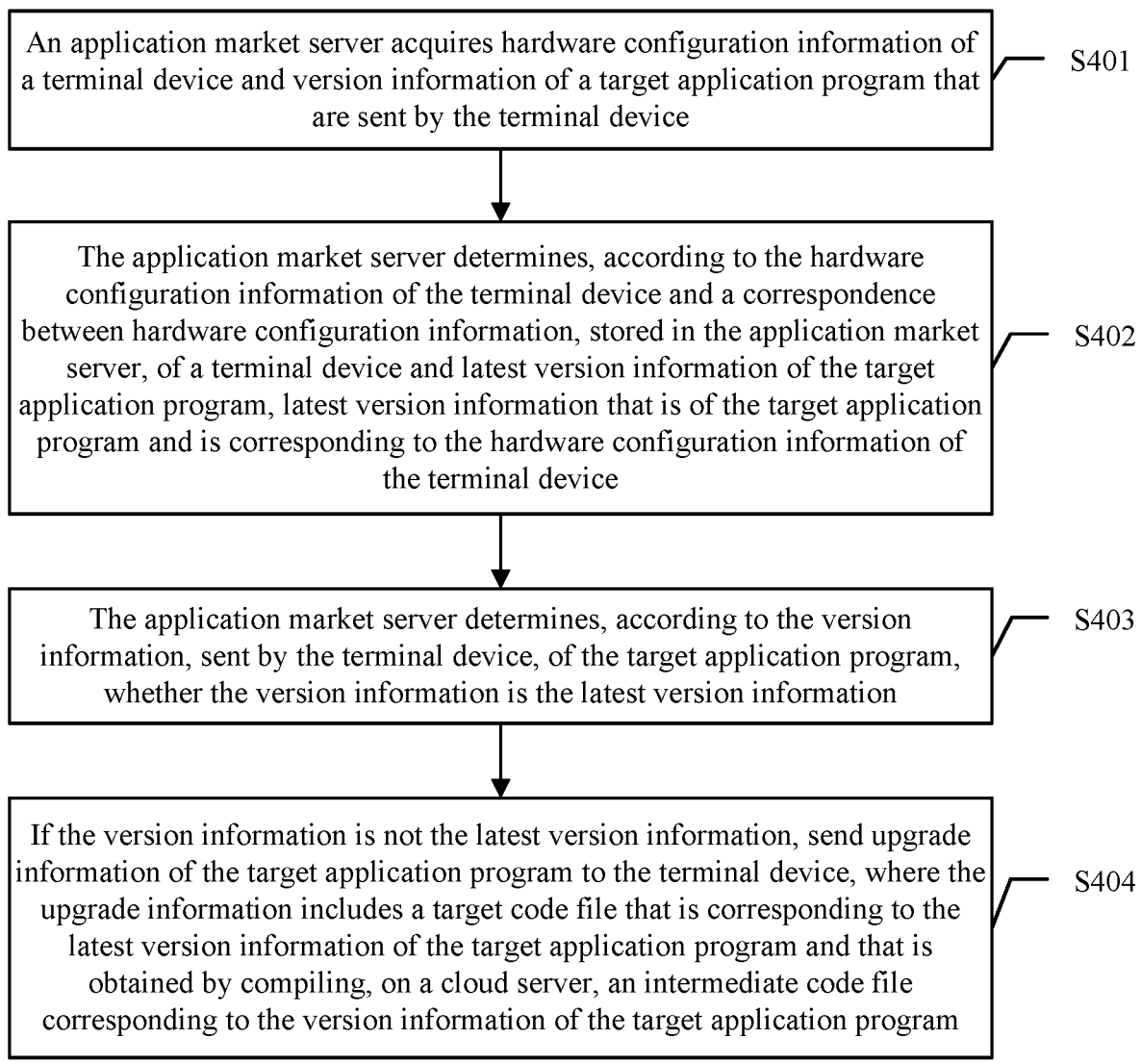
FIG. 6 is a schematic flowchart of a third embodiment of a method for implementing JAVA application installation by cloud compilation according to an embodiment of the present disclosure.

Refer to FIG. 6, which is a schematic flowchart of a fourth embodiment of a method for implementing JAVA application program installation by cloud compilation according to an embodiment of the present disclosure. The method described in this embodiment of the present disclosure includes the following steps.

S401: An application market server acquires hardware configuration information of a terminal device and version information of a target application program that are sent by the terminal device.

In specific implementation, the following describes, from a perspective of an application market server, how the application market server directly or indirectly communicates with a cloud server and a mobile phone, and implements update installation of a JAVA application program. The following describes, using an application market server as an execution body, the provided method for implementing JAVA application program installation by cloud compilation in this embodiment of the present disclosure.

In some feasible implementation manners, the application market server may first receive, from a terminal device (for example, a mobile phone), hardware configuration information of the mobile phone and version information of a target application program currently installed on the mobile phone to determine, according to the hardware configuration information of the mobile phone, whether a version of the target application program currently installed on the mobile phone is a latest version, and determine whether the target application program installed on the mobile needs to be updated.

S402. The application market server determines, according to the hardware configuration information of the terminal device and a correspondence between hardware configuration information, stored in the application market server, of a terminal device and latest version information of the target application program, latest version information that is of the target application program and is corresponding to the hardware configuration information of the terminal device.

In some feasible implementation manners, after acquiring the hardware configuration information of the mobile phone, the application market server may determine, according to a correspondence between hardware configuration information, stored in the application market server, of a mobile phone and latest version information of a target application program, latest version information that is of the target application program and is corresponding to the foregoing hardware configuration information sent by the mobile phone. That is, the application market server may compare the hardware configuration information sent by the mobile phone with the hardware configuration information, stored by the application market server, of the mobile phone, and determine whether the hardware configuration information sent by the mobile phone is included in hardware configuration information, pre-stored in the application market server, of a terminal device. If determining that the foregoing hardware configuration information sent by the mobile phone is included in the pre-stored hardware configuration information, the application market server may determine, according to a correspondence between the pre-stored hardware configuration information and the latest version information of the target application program, the latest version information that is of the target application program and is corresponding to the hardware configuration information sent by the mobile phone.

S403. The application market server determines, according to the version information, sent by the terminal device, of the target application program, whether the version information is the latest version information.

S404. If the version information is not the latest version information, send upgrade information of the target application program to the terminal device, where the upgrade information includes a target code file that is corresponding to the latest version information of the target application program and that is obtained by compiling, on a cloud server, an intermediate code file corresponding to the version information of the target application program.

In some feasible implementation manners, after determining the latest version information that is of the target application program and is corresponding to the hardware configuration information sent by the mobile phone, the application market server may determine, according to the version information, sent by the mobile phone, of the target application program currently installed on the mobile phone, whether a version of the target application program installed on the mobile phone is a latest version. If learning, by determining, that the version information of the target application program currently installed on the mobile phone is not the latest version information, the application market server may send upgrade information, obtained by the cloud server by compilation, of the target application program to the mobile phone. The foregoing upgrade information of the target application program includes a target code file that is corresponding to the latest version information of the target application program and that is obtained by compiling, on the cloud server, an intermediate code file corresponding to the version information of the target application program. The application market server may pre-obtain the foregoing target code file that is corresponding to the latest version information of the target application program and that is obtained by the cloud server by compilation, and store the target code file to a specified location, and further, when learning, by determining, that the version of the target application program currently installed on the mobile phone is not the latest version, may send the foregoing target code file corresponding to the latest version information to the mobile phone for the mobile phone to download and install, and update the target application program installed on the mobile phone.

In this embodiment of the present disclosure, an application market server may acquire hardware configuration information of a mobile phone and version information of a target application program currently installed on the mobile phone, and further, may determine, according to latest version information that is of the target application program and is corresponding to the hardware configuration information, stored in the application market server, of the mobile phone, whether to update a version of the target application program installed on the mobile phone. If the version of the target application program needs to be updated, a *.dex file obtained by the mobile phone by local compilation may be sent to a cloud server, and optimized compilation is performed using the cloud server. Further, an optimized target code file, obtained by the cloud server by compilation, of the target application program is stored to a specified location of the application market server. Further, the foregoing optimized target code file of the target application program is sent to the mobile phone for the mobile phone to perform optimized installation of the target application program. In this embodiment of the present disclosure, the hardware configuration information of the terminal device or an intermediate file, obtained by the terminal device by local compilation, of the target application program may be sent to the cloud server. Optimized compilation of the intermediate code file of the target application program is implemented using the cloud server, and a target code file corresponding to latest version information of the target application program is obtained. The application market server may further send the target code file, obtained by the cloud server by compilation, of the target application program to the mobile phone such that the mobile phone does not need to perform upgrade and optimization of an application program on the device, which reduces running memory and storage space of the mobile phone that are occupied for the upgrade and optimization of the application program, improves efficiency of the optimization of the application program, and enhances user experience of the mobile phone.

Figure 7:
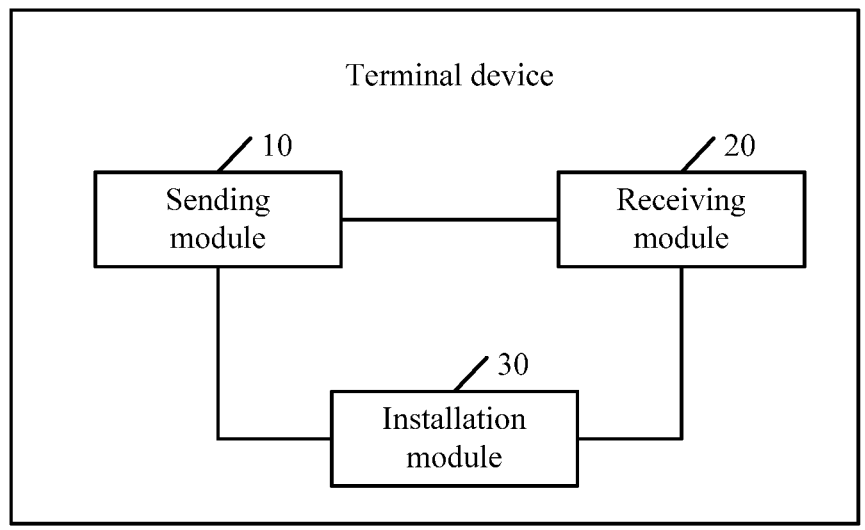
FIG. 7 is a schematic structural diagram of a first embodiment of a terminal device according to an embodiment of the present disclosure.

Refer to FIG. 7, which is a schematic structural diagram of a first embodiment of a terminal device according to an embodiment of the present disclosure. The terminal device described in this embodiment of the present disclosure includes a sending module 10 configured to send hardware configuration information of the terminal device and version information of a target application program to an application market server to acquire, using the application market server, upgrade information that is of the target application program and is corresponding to the hardware configuration information and the version information of the target application program, a receiving module 20 configured to receive the upgrade information, fed back by the application market server, of the target application program, where the upgrade information includes a target code file that is corresponding to latest version information of the target application program and that is obtained by compiling, on a cloud server, an intermediate code file corresponding to the version information of the target application program, and an installation module 30 configured to perform optimized installation of the target application program according to the upgrade information received by the receiving module to update a version of the target application program.

In some feasible implementation manners, the foregoing receiving module 20 is configured to receive an optimized installation package that is corresponding to the latest version information of the target application program and is sent by the application market server, where the optimized installation package is generated by packaging the target code file corresponding to the latest version information of the target application program, the target code file is obtained by the cloud server by compilation according to an intermediate code file corresponding to all functions included in the version information of the target application program, and the optimized installation package is stored in the application market server.

In some feasible implementation manners, the foregoing installation module 30 is configured to re-install the target application program according to the optimized installation package received by the receiving module to update versions of all the functions of the target application program to latest versions.

In some feasible implementation manners, the foregoing receiving module 20 is configured to receive an incremental upgrade package, sent by the application market server, of the target application program, where the incremental upgrade package is generated by packaging a target code file of latest version information of a specified function in the target application program, the target code file is obtained by the cloud server by compilation according to an intermediate code file corresponding to the specified function to be upgraded and optimized in the target application program, and the incremental upgrade package is stored in the application market server.

In some feasible implementation manners, the foregoing installation module 30 is configured to converge the incremental upgrade package, received by the receiving module, of the target application program and an installation package corresponding to the version information of the target application program to generate an installation package that is of the target application program and includes the latest version information of the specified function, and re-install the target application program according to the installation package to update a version of the specified function of the target application program to a latest version.

In specific implementation, the terminal device described in this embodiment of the present disclosure may implement, using the sending module 10, the receiving module 20, and the installation module 30 of the terminal device, the implementation manners described in the first and second embodiments of the described method for implementing JAVA application program installation by cloud compilation in the embodiments of the present disclosure. For implementation manners executed by the modules included in the foregoing terminal device, reference may be made to the implementation manners executed in the steps in the first and second embodiments of the described method for implementing JAVA application program installation by cloud compilation in the foregoing embodiments of the present disclosure, and details are not described herein again.

In this embodiment of the present disclosure, a terminal device may send hardware configuration information of the terminal device and version information of a target application program currently installed on the terminal device to an application market server to obtain, by the application market server by matching, latest version information that is of the target application program and is corresponding to the hardware configuration information of the terminal device. The terminal device may receive upgrade information, sent by the application market server, of the target application program, and further, may perform optimized installation of the target application program according to the foregoing upgrade information, and update the target application program on the terminal device by installing an optimized application program (that is, an application program of a latest version) such that the target application program reaches the latest version. According to the terminal device described in this embodiment of the present disclosure, a process of obtaining a target code file corresponding to latest version information by compiling an intermediate code file corresponding to current version information of a target application program may be performed on a cloud market server, and the terminal device does not need to perform compilation for upgrade and optimization of an application program on the device, which reduces running memory and storage space of a mobile phone that are occupied for upgrade and optimization of an application program, improves efficiency of optimized installation of the application program, and enhances user experience of the mobile phone. By fast application installation, users who originally perform installation on another network are attracted to download applications from the application market described in this embodiment of the present disclosure for installation.

Figure 8:
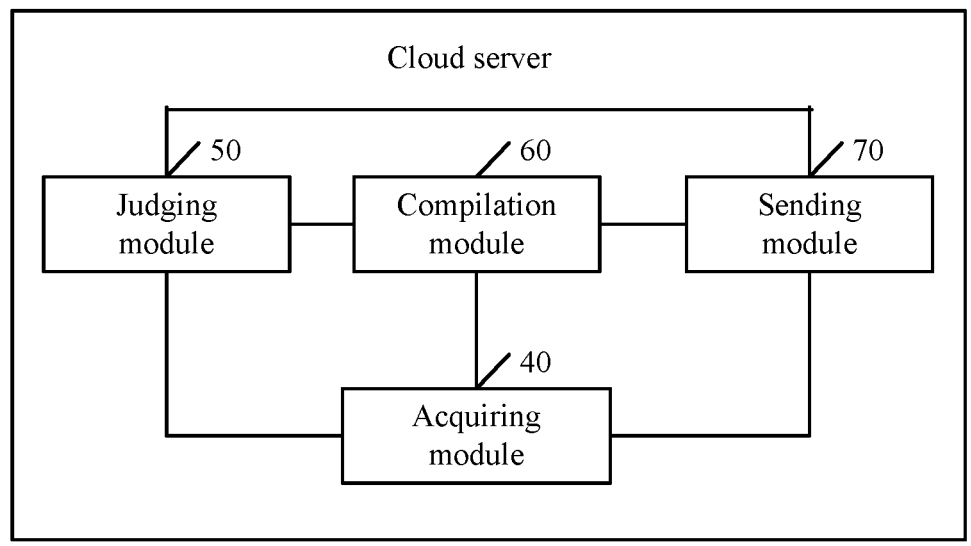
FIG. 8 is a schematic structural diagram of a first embodiment of a cloud server according to an embodiment of the present disclosure.

Refer to FIG. 8, which is a schematic structural diagram of a first embodiment of a cloud server according to an embodiment of the present disclosure. The cloud server described in this embodiment of the present disclosure includes an acquiring module 40 configured to acquire hardware configuration information of a target terminal device and an intermediate code file of a built-in target application program of the target terminal device that are sent by an application market server, a judging module 50 configured to determine, according to the hardware configuration information, acquired by the acquiring module, of the target terminal device and a correspondence between hardware configuration information, stored by the cloud server, of a terminal device and version information of an application program, whether a version of the built-in target application program of the target terminal device is a latest version, a compilation module 60 configured to when a determining result of the judging module is no, compile the intermediate code file of the target application program according to latest version information to obtain a target code file corresponding to the latest version information of the target application program, and a sending module 70 configured to send the target code file, obtained by the compilation module by compilation, corresponding to the latest version information of the target application program to the application market server to send, using the application market server, the target code file corresponding to the latest version information of the target application program to the target terminal device.

In some feasible implementation manners, the foregoing judging module 50 is configured to match the hardware configuration information, acquired by the acquiring module, of the target terminal device with hardware configuration information, stored by the cloud server, of various terminal devices, and determine whether the hardware configuration information of the target terminal device is any one piece of the hardware configuration information, stored by the cloud server, of the terminal devices, if the hardware configuration information of the target terminal device is any one piece of the hardware configuration information stored by the cloud server, determine, according to a correspondence between the hardware configuration information of the terminal devices and version information of application programs, latest version information that is of the target application program and is corresponding to the hardware configuration information of the target terminal device, and match version information of the built-in target application program of the target terminal device with the latest version information of the target application program to determine whether the version of the built-in target application program of the target terminal device is the latest version.

In some feasible implementation manners, the foregoing compilation module 60 is configured to match version information of the built-in target application program of the target terminal device with the latest version information of the target application program, and determine upgrade information of a specified function that is newly added in the latest version information of the target application program, and compile, according to the upgrade information of the specified function, an intermediate code file included in an installation package of the built-in target application program of the target terminal to obtain the target code file that is corresponding to the latest version information of the target application program and includes latest version information of the specified function, and package the target code file to generate an optimized installation package corresponding to the latest version information of the target application program.

In some feasible implementation manners, the foregoing compilation module 60 is configured to match version information of the built-in target application program of the target terminal device with the latest version information of the target application program, and determine upgrade information of a specified function that is newly added in the latest version information of the target application program, and compile, according to the upgrade information of the specified function, an intermediate code file corresponding to the specified function to generate a target code file corresponding to latest version information of the specified function, and package the target code file to generate an incremental upgrade package of the target application program.

In some feasible implementation manners, the foregoing acquiring module 40 is further configured to acquire hardware configuration information of at least one terminal device of at least one hardware configuration type from an application market using the application market server, acquire, from the application market using the application market server, latest version information of at least one application program that is corresponding to the hardware configuration information of the terminal devices, and establish a correspondence between the hardware configuration information of the terminal devices and the latest version information of the application programs.

In specific implementation, the cloud server described in this embodiment of the present disclosure may implement, using the acquiring module 40, the judging module 50, the compilation module 60, and the sending module 70 of the cloud server, the implementation manner described in the third embodiment of the described method for implementing JAVA application program installation by cloud compilation in the embodiments of the present disclosure. For implementation manners executed by the modules included in the foregoing cloud server, reference may be made to the implementation manners executed in the steps in the third embodiment of the described method for implementing JAVA application program installation by cloud compilation in the foregoing embodiments of the present disclosure, and details are not described herein again.

In this embodiment of the present disclosure, a cloud server may acquire, using an application market server, hardware configuration information of a terminal device and version information of a target application program currently installed on the terminal device, and further, may determine, according to latest version information, prestored in the cloud server, of the target application program, whether to update a version of the target application program installed on the terminal device. If the version of the target application program needs to be updated, optimized compilation may be performed on a *.dex file obtained by the terminal device by local compilation, to obtain optimized APK of the target application program or an incremental upgrade package. Further, the foregoing optimized APK or the incremental upgrade package may be sent to the application market server for the terminal device to download and install. The cloud server described in this embodiment of the present disclosure may perform compilation optimization for upgrade of a target application program on the cloud server, and a terminal device does not need to perform upgrade and optimization of an application program on the device, which reduces running memory and storage space of the terminal device that are occupied for the upgrade and optimization of the application program, improves efficiency of the optimization of the application program, and enhances user experience of the terminal device. In this embodiment of the present disclosure, by, for example, sufficient optimization time of cloud compilation, application developers having high performance requirements are attracted to mount application programs on the application market described in this embodiment of the present disclosure.

Figure 9:
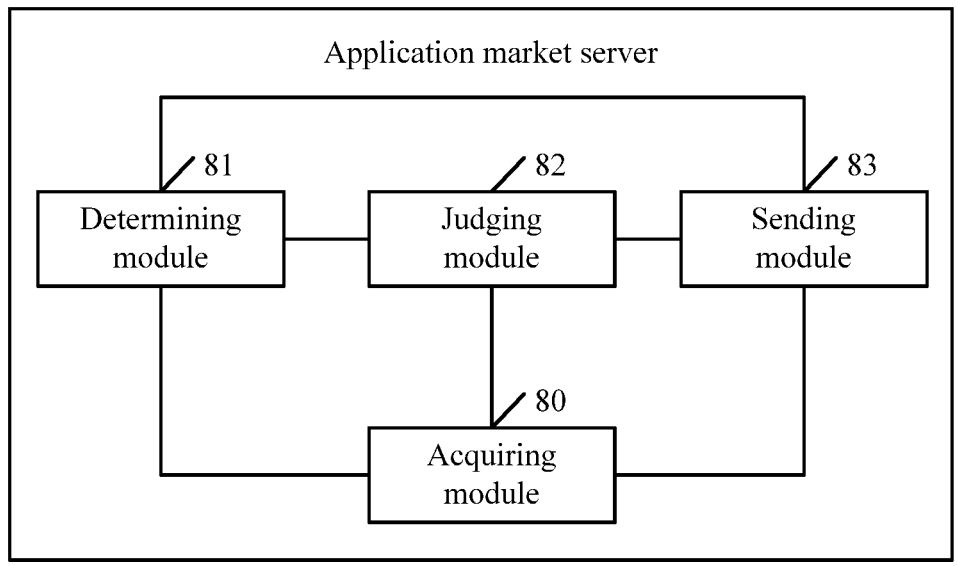
FIG. 9 is a schematic structural diagram of a first embodiment of an application market server according to an embodiment of the present disclosure.

Refer to FIG. 9, which is a schematic structural diagram of a first embodiment of an application market server according to an embodiment of the present disclosure. The application market server described in this embodiment of the present disclosure includes an acquiring module 80 configured to acquire hardware configuration information of a terminal device and version information of a target application program that are sent by the terminal device, a determining module 81 configured to determine, according to the hardware configuration information, acquired by the acquiring module, of the terminal device and a correspondence between hardware configuration information, stored in the application market server, of a terminal device and latest version information of the target application program, latest version information that is of the target application program and is corresponding to the hardware configuration information of the terminal device, a judging module 82 configured to determine, according to the version information, sent by the terminal device and acquired by the acquiring module, of the target application program, whether the version information is the latest version information, and a sending module 83 configured to, when a determining result of the judging module is no, send upgrade information of the target application program to the terminal device, where the upgrade information includes a target code file that is corresponding to the latest version information of the target application program and that is obtained by compiling, on a cloud server, an intermediate code file corresponding to the version information of the target application program.

In some feasible implementation manners, the foregoing sending module 83 is further configured to send configuration information of the terminal device and an intermediate code file, stored in the application market server, of the target application program to the cloud server to compile the intermediate code file of the target application program according to the latest version information of the target application program using the cloud server, and obtain the target code file corresponding to the latest version information of the target application program.

In specific implementation, the application market server described in this embodiment of the present disclosure may implement, using the acquiring module 80, the determining module 81, the judging module 82, and the sending module 83 of the application market server, the implementation manner described in the fourth embodiment of the described method for implementing JAVA application program installation by cloud compilation in the embodiments of the present disclosure. For implementation manners executed by the modules included in the foregoing application market server, reference may be made to the implementation manners executed in the steps in the fourth embodiment of the described method for implementing JAVA application program installation by cloud compilation in the foregoing embodiments of the present disclosure, and details are not described herein again.

In this embodiment of the present disclosure, an application market server may acquire hardware configuration information of a terminal device and version information of a target application program currently installed on the terminal device, and further, may determine, according to latest version information that is of the target application program and is corresponding to the hardware configuration information, stored in the application market server, of the terminal device, whether to update a version of the target application program installed on the terminal device. If the version of the target application program needs to be updated, a *.dex file obtained by the terminal device by local compilation may be sent to a cloud server, and optimized compilation is performed using the cloud server. Further, an optimized target code file, obtained by the cloud server by compilation, of the target application program is stored to a specified location of the application market server. Further, the foregoing optimized target code file of the target application program is sent to the terminal device for the terminal device to perform optimized installation of the target application program. The application market server described in this embodiment of the present disclosure may send the hardware configuration information of the terminal device or an intermediate file, obtained by the terminal device by local compilation, of the target application program to the cloud server. Optimized compilation of the intermediate code file of the target application program is implemented using the cloud server, and a target code file corresponding to latest version information of the target application program is obtained. The application market server may further send the target code file, obtained by the cloud server by compilation, of the target application program to a mobile phone, and the terminal device does not need to perform upgrade and optimization of an application program on the device, which reduces running memory and storage space of the mobile phone that are occupied for upgrade and optimization of an application program, improves efficiency of the optimization of the application program, and enhances user experience of the mobile phone.

Figure 10:
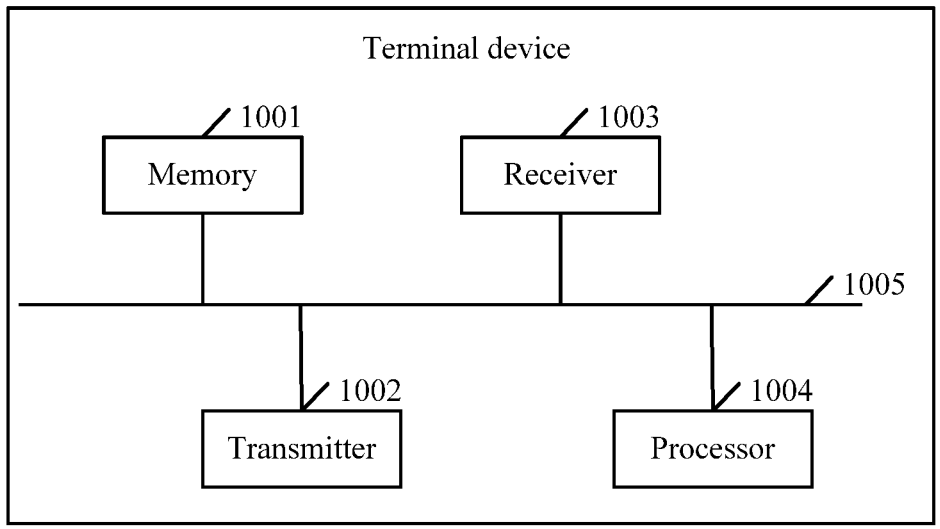
FIG. 10 is a schematic structural diagram of a second embodiment of a terminal device according to an embodiment of the present disclosure.

Refer to FIG. 10, which is a schematic structural diagram of a second embodiment of a terminal device according to an embodiment of the present disclosure. The terminal device described in this embodiment of the present disclosure includes a memory 1001, a transmitter 1002, a receiver 1003, and a processor 1004, where the foregoing memory 1001, transmitter 1002, receiver 1003, and processor 1004 are connected using a bus 1005.

The foregoing memory 1001 stores a group of program code.

The foregoing transmitter 1002, receiver 1003, and processor 1004 are configured to invoke the program code stored in the foregoing memory 1001 to execute the following operations: the foregoing transmitter 1002 is configured to send hardware configuration information of the terminal device and version information of a target application program to an application market server to acquire, using the application market server, upgrade information that is of the target application program and is corresponding to the hardware configuration information and the version information of the target application program, the foregoing receiver 1003 is configured to receive the upgrade information, fed back by the application market server, of the target application program, where the upgrade information includes a target code file that is corresponding to latest version information of the target application program and that is obtained by compiling, on a cloud server, an intermediate code file corresponding to the version information of the target application program, and the foregoing processor 1004 is configured to perform optimized installation of the target application program according to the upgrade information received by the receiver to update a version of the target application program.

In some feasible implementation manners, the foregoing receiver 1003 is configured to receive an optimized installation package that is corresponding to the latest version information of the target application program and is sent by the application market server, where the optimized installation package is generated by packaging the target code file corresponding to the latest version information of the target application program, the target code file is obtained by the cloud server by compilation according to an intermediate code file corresponding to all functions included in the version information of the target application program, and the optimized installation package is stored in the application market server.

In some feasible implementation manners, the foregoing processor 1004 is configured to re-install the target application program according to the optimized installation package received by the receiver to update versions of all the functions of the target application program to latest versions.

In some feasible implementation manners, the foregoing receiver 1003 is configured to receive an incremental upgrade package, sent by the application market server, of the target application program, where the incremental upgrade package is generated by packaging a target code file of latest version information of a specified function in the target application program, the target code file is obtained by the cloud server by compilation according to an intermediate code file corresponding to the specified function to be upgraded and optimized in the target application program, and the incremental upgrade package is stored in the application market server.

In some feasible implementation manners, the foregoing processor 1004 is configured to converge the incremental upgrade package, received by the receiver, of the target application program and an installation package corresponding to the version information of the target application program to generate an installation package that is of the target application program and includes the latest version information of the specified function, and re-install the target application program according to the installation package to update a version of the specified function of the target application program to a latest version.

In specific implementation, the terminal device described in this embodiment of the present disclosure may implement, using the transmitter 1002, the receiver 1003, and the processor 1004 of the terminal device, the implementation manners described in the first and second embodiments of the described method for implementing JAVA application program installation by cloud compilation in the embodiments of the present disclosure. For implementation manners executed by the modules included in the foregoing terminal device, reference may be made to the implementation manners described in the steps in the first and second embodiments of the described method for implementing JAVA application program installation by cloud compilation in the foregoing embodiments of the present disclosure, and details are not described herein again.

In this embodiment of the present disclosure, a terminal device may send hardware configuration information of the terminal device and version information of a target application program currently installed on the terminal device to an application market server to obtain, by the application market server by matching, latest version information that is of the target application program and is corresponding to the hardware configuration information of the terminal device. The terminal device may receive upgrade information, sent by the application market server, of the target application program, and further, may perform optimized installation of the target application program according to the foregoing upgrade information, and update the target application program on the terminal device by installing an optimized application program (that is, an application program of a latest version) such that the target application program reaches the latest version. In this embodiment of the present disclosure, a process of obtaining a target code file corresponding to latest version information by compiling an intermediate code file corresponding to current version information of a target application program is performed on a cloud market server, and a terminal device does not need to perform compilation for upgrade and optimization of an application program on the device, which reduces running memory and storage space of the terminal device that are occupied for the upgrade and optimization of the application program, improves efficiency of optimized installation of the application program, and enhances user experience of the terminal device. By fast application installation, users who originally perform installation on another network are attracted to download applications from the application market described in this embodiment of the present disclosure for installation.

Figure 11:
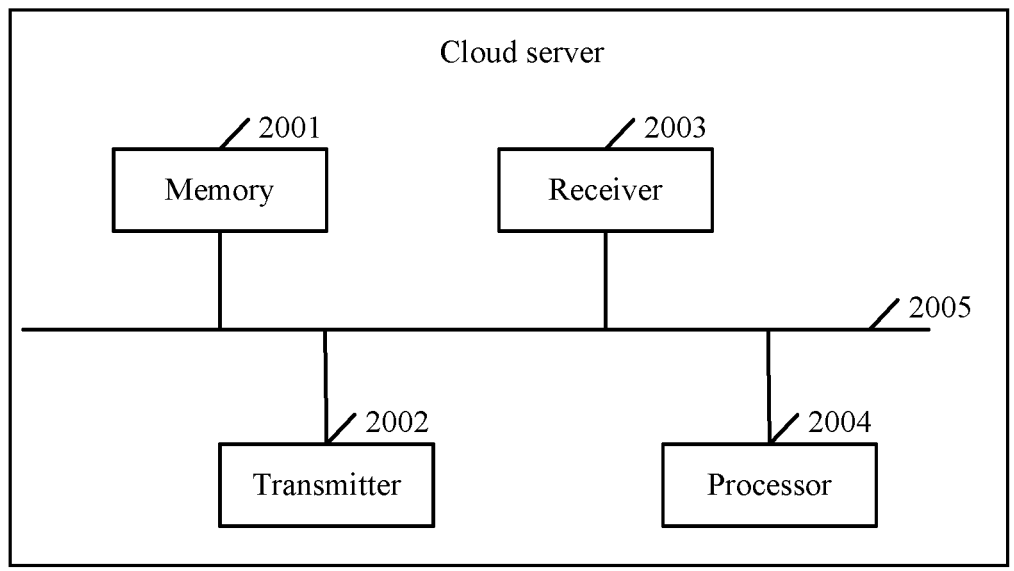
FIG. 11 is a schematic structural diagram of a second embodiment of a cloud server according to an embodiment of the present disclosure.

Refer to FIG. 11, which is a schematic structural diagram of a second embodiment of a cloud server according to an embodiment of the present disclosure. The cloud server described in this embodiment of the present disclosure includes a memory 2001, a transmitter 2002, a receiver 2003, and a processor 2004, where the foregoing memory 2001, transmitter 2002, receiver 2003, and processor 2004 are connected using a bus 2005.

The foregoing memory 2001 stores a group of program code.

The foregoing transmitter 2002, receiver 2003, and processor 2004 are configured to invoke the program code stored in the foregoing memory 2001 to execute the following operations.

The foregoing receiver 2003 is configured to acquire hardware configuration information of a target terminal device and an intermediate code file of a built-in target application program of the target terminal device that are sent by an application market server.

The foregoing processor 2004 is configured to determine, according to the hardware configuration information, acquired by the receiver, of the target terminal device and a correspondence between hardware configuration information, stored by the cloud server, of a terminal device and version information of an application program, whether a version of the built-in target application program of the target terminal device is a latest version.

The foregoing processor 2004 is further configured to, when determining that the version of the built-in target application program of the target terminal device is not the latest version, compile the intermediate code file of the target application program according to latest version information to obtain a target code file corresponding to the latest version information of the target application program.

The foregoing transmitter 2002 is configured to send the target code file, obtained by the processor by processing, corresponding to the latest version information of the target application program to the application market server to send, using the application market server, the target code file corresponding to the latest version information of the target application program to the target terminal device.

In some feasible implementation manners, the foregoing processor 2004 is configured to match the hardware configuration information, acquired by the receiver, of the target terminal device with hardware configuration information, stored by the cloud server, of various terminal devices, and determine whether the hardware configuration information of the target terminal device is any one piece of the hardware configuration information, stored by the cloud server, of the terminal devices, if the hardware configuration information of the target terminal device is any one piece of the hardware configuration information stored by the cloud server, determine, according to a correspondence between the hardware configuration information of the terminal devices and version information of application programs, latest version information that is of the target application program and is corresponding to the hardware configuration information of the target terminal device, and match version information of the built-in target application program of the target terminal device with the latest version information of the target application program to determine whether the version of the built-in target application program of the target terminal device is the latest version.

In some feasible implementation manners, the foregoing processor 2004 is configured to match version information of the built-in target application program of the target terminal device with the latest version information of the target application program, and determine upgrade information of a specified function that is newly added in the latest version information of the target application program, and compile, according to the upgrade information of the specified function, an intermediate code file included in an installation package of the built-in target application program of the target terminal to obtain the target code file that is corresponding to the latest version information of the target application program and includes latest version information of the specified function, and package the target code file to generate an optimized installation package corresponding to the latest version information of the target application program.

In some feasible implementation manners, the foregoing processor 2004 is configured to match version information of the built-in target application program of the target terminal device with the latest version information of the target application program, and determine upgrade information of a specified function that is newly added in the latest version information of the target application program, and compile, according to the upgrade information of the specified function, an intermediate code file corresponding to the specified function to generate a target code file corresponding to latest version information of the specified function, and package the target code file to generate an incremental upgrade package of the target application program.

In some feasible implementation manners, the foregoing receiver 2003 is further configured to acquire hardware configuration information of at least one terminal device of at least one hardware configuration type from an application market using the application market server, and acquire, from the application market using the application market server, latest version information of at least one application program that is corresponding to the hardware configuration information of the terminal devices.

The foregoing processor 2004 is further configured to establish a correspondence between the hardware configuration information of the terminal devices and the latest version information of the application programs.

In specific implementation, the cloud server described in this embodiment of the present disclosure may implement, using modules such as the transmitter 2002, the receiver 2003, and the processor 2004 of the cloud server, the implementation manner described in the third embodiment of the described method for implementing JAVA application program installation by cloud compilation in the embodiments of the present disclosure. For implementation manners executed by the modules included in the foregoing cloud server, reference may be made to the implementation manners described in the steps in the third embodiment of the described method for implementing JAVA application program installation by cloud compilation in the foregoing embodiments of the present disclosure, and details are not described herein again.

In this embodiment of the present disclosure, a cloud server may acquire, using an application market server, hardware configuration information of a terminal device and version information of a target application program currently installed on the terminal device, and further, may determine, according to latest version information, prestored in the cloud server, of the target application program, whether to update a version of the target application program installed on the terminal device. If the version of the target application program needs to be updated, optimized compilation may be performed on a *.dex file obtained by the terminal device by local compilation, to obtain optimized APK of the target application program or an incremental upgrade package. Further, the foregoing optimized APK or the incremental upgrade package may be sent to the application market server for the terminal device to download and install. In this embodiment of the present disclosure, compilation optimization for upgrade of a target application program is performed on the cloud server, and a terminal device does not need to perform upgrade and optimization of an application program on the device, which reduces running memory and storage space of the terminal device that are occupied for the upgrade and optimization of the application program, improves efficiency of the optimization of the application program, and enhances user experience of the terminal device. In this embodiment of the present disclosure, by, for example, sufficient optimization time of cloud compilation, application developers having high performance requirements are attracted to mount application programs on the application market described in this embodiment of the present disclosure.

Figure 12:
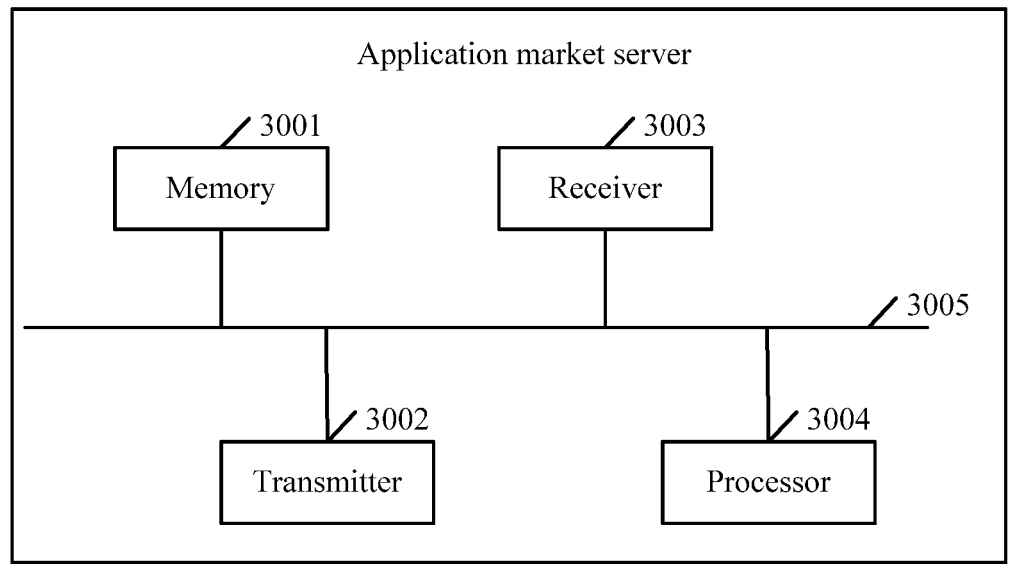
FIG. 12 is a schematic structural diagram of a second embodiment of an application market server according to an embodiment of the present disclosure.

Refer to FIG. 12, which is a schematic structural diagram of a second embodiment of an application market server according to an embodiment of the present disclosure. The application market server described in this embodiment of the present disclosure includes a memory 3001, a transmitter 3002, a receiver 3003, and a processor 3004, where the foregoing memory 3001, transmitter 3002, receiver 3003, and processor 3004 are connected using a bus 3005.

The foregoing memory 3001 stores a group of program code.

The foregoing transmitter 3002, receiver 3003, and processor 3004 are configured to invoke the program code stored in the foregoing memory 3001 to execute the following operations.

The foregoing transmitter 3002 is configured to acquire hardware configuration information of a terminal device and version information of a target application program that are sent by the terminal device.

The foregoing processor 3004 is configured to determine, according to the hardware configuration information, acquired by the transmitter, of the terminal device and a correspondence between hardware configuration information, stored in the application market server, of a terminal device and latest version information of the target application program, latest version information that is of the target application program and is corresponding to the hardware configuration information of the terminal device.

The foregoing processor 3004 is further configured to determine, according to the version information, sent by the terminal device and acquired by the receiver, of the target application program, whether the version information is the latest version information.

The foregoing transmitter 3002 is configured to, when a determining result of the processor is no, send upgrade information of the target application program to the terminal device, where the upgrade information includes a target code file that is corresponding to the latest version information of the target application program and that is obtained by compiling, on a cloud server, an intermediate code file corresponding to the version information of the target application program.

In some feasible implementation manners, the foregoing transmitter 3002 is further configured to send configuration information of the terminal device and an intermediate code file, stored in the application market server, of the target application program to the cloud server to compile the intermediate code file of the target application program according to the latest version information of the target application program using the cloud server, and obtain the target code file corresponding to the latest version information of the target application program.

In specific implementation, the application market server described in this embodiment of the present disclosure may implement, using modules such as the transmitter 3002, the receiver 3003, and the processor 3004 of the application market server, the implementation manner described in the fourth embodiment of the described method for implementing JAVA application program installation by cloud compilation in the embodiments of the present disclosure. For implementation manners executed by the modules included in the foregoing application market server, reference may be made to the implementation manners described in the steps in the fourth embodiment of the described method for implementing JAVA application program installation by cloud compilation in the foregoing embodiments of the present disclosure, and details are not described herein again.

In this embodiment of the present disclosure, an application market server may acquire hardware configuration information of a terminal device and version information of a target application program currently installed on the terminal device, and further, may determine, according to latest version information that is of the target application program and is corresponding to the hardware configuration information, stored in the application market server, of the terminal device, whether to update a version of the target application program installed on the terminal device. If the version of the target application program needs to be updated, a *.dex file obtained by the terminal device by local compilation may be sent to a cloud server, and optimized compilation is performed using the cloud server. Further, an optimized target code file, obtained by the cloud server by compilation, of the target application program is stored to a specified location of the application market server. Further, the foregoing optimized target code file of the target application program is sent to the terminal device for the terminal device to perform optimized installation of the target application program. In this embodiment of the present disclosure, the hardware configuration information of the terminal device or an intermediate file, obtained by the terminal device by local compilation, of the target application program may be sent to the cloud server. Optimized compilation of the intermediate code file of the target application program is implemented using the cloud server, and a target code file corresponding to latest version information of the target application program is obtained. The application market server may further send the target code file, obtained by the cloud server by compilation, of the target application program to the terminal device, and the terminal device does not need to perform upgrade and optimization of an application program on the device, which reduces running memory and storage space of the terminal device that are occupied for the upgrade and optimization of the application program, improves efficiency of the optimization of the application program, and enhances user experience of a mobile phone.

Figure 13:
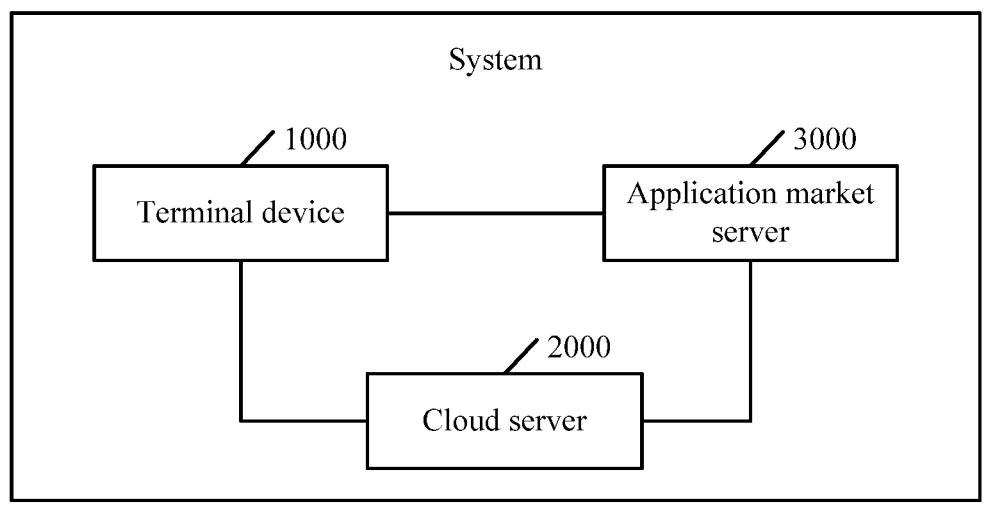
FIG. 13 is a schematic structural diagram of an embodiment of a system for implementing JAVA application installation by cloud compilation according to an embodiment of the present disclosure.

Refer to FIG. 13, which is a schematic structural diagram of an embodiment of a system for implementing JAVA application program installation by cloud compilation according to an embodiment of the present disclosure. The system described in this embodiment of the present disclosure includes the terminal device 1000, the cloud server 2000, and the application market server 3000 that are described in the embodiments of the present disclosure. For a system architecture constituted by the terminal device 1000, the cloud server 2000, and the application market server 3000 that are described in the embodiments of the present disclosure, reference may be made to FIG. 10.

In specific implementation, the system described in this embodiment of the present disclosure may implement, using the terminal device 1000, the cloud server 2000, and the application market server 3000 of the system, the implementation manners described in the first to fourth embodiments of the described method for implementing JAVA application program installation by cloud compilation in the embodiments of the present disclosure. For implementation manners executed by the foregoing terminal device 1000, cloud server 2000, and application market server 3000, reference may be made to the implementation manners described in the first to fourth embodiments of the described method for implementing JAVA application program installation by cloud compilation in the foregoing embodiments of the present disclosure, and details are not described herein again.

A person of ordinary skill in the art may understand that all or some of the processes of the methods in the foregoing embodiments may be implemented by a computer program instructing relevant hardware (such as a processor). The program may be stored in a computer-readable storage medium. When the program runs, the processes of the methods in the embodiments are performed. The storage medium may be a magnetic disk, an optical disc, a read-only memory (ROM), or a random access memory (RAM).

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A method for application program installation by cloud compilation, comprising:
acquiring, by a cloud server from an application market server, hardware configuration information of a target terminal device and an intermediate code file of a to-be-optimized target application program of the target terminal device;
determining, by the cloud server, whether a version of the to-be-optimized target application program of the target terminal device is a latest version of a target application program based on a correspondence between the hardware configuration information of the target terminal device and version information of the target application program;
compiling, by the cloud server, the intermediate code file of the to-be-optimized target application program based on the latest version of the target application program in response to the version of the to-be-optimized target application program of the target terminal device not being the latest version;

obtaining, by the cloud server, a target code file corresponding to the latest version of the target application program in response to compiling the intermediate code file of the to-be-optimized target application program; and sending, by the cloud server, the target code file corresponding to the latest version of the target application program to the application market server.

2. The method of claim 1, wherein determining whether the version of the to-be-optimized target application program of the target terminal device is the latest version comprises:

matching, by the cloud server, the hardware configuration information of the target terminal device with different hardware configuration information of various terminal devices stored by the cloud server;

determining the latest version of the target application program that corresponds to the hardware configuration information of the target terminal device based on a correspondence between different hardware configuration information of the various terminal devices and the version information of the target application program in response to the hardware configuration information of the target terminal device being included in the different hardware configuration information of the various terminal devices;

matching version information of the to-be-optimized target application program of the target terminal device with the latest version of the target application program; and determining whether the version of the to-be-optimized target application program of the target terminal device is the latest version based on matching the version information of the to-be-optimized target application program with the latest version of the target application program.

3. The method of claim 1, wherein compiling the intermediate code file of the target application program according to the latest version to obtain the target code file corresponding to the latest version of the target application program comprises:

compiling, based on upgrade information of a specified function in the latest version of the target application program, the intermediate code file comprised in an installation package of the to-be-optimized target application program of the target terminal device;

obtaining the target code file that corresponds to the latest version of the target application program in response to compiling the intermediate code file, wherein the target code file comprises the latest version of the specified function; and packaging the target code file to generate an optimized installation package corresponding to the latest version of the target application program.

4. The method of claim 1, wherein compiling the intermediate code file of the target application program according to the latest version to obtain the target code file corresponding to the latest version of the target application program comprises:

compiling, according to an upgrade information of a specified function in the latest version of the target application program, the intermediate code file corresponding to the specified function;

generating the target code file corresponding to latest version information of the specified function in response to compiling the intermediate code file corresponding to the specified function; and packaging the target code file to generate an incremental upgrade package of the target application program.

5. The method of claim 1, wherein before acquiring the hardware configuration information of the target terminal device, the method further comprises:

acquiring, by the cloud server, hardware configuration information of at least one terminal device of at least one hardware configuration type from an application market using the application market server; and establishing a correspondence between the hardware configuration information of the at least one terminal device and the latest version of the target application program.

6. A method for application program installation by cloud compilation, comprising:

acquiring, by an application market server from a target terminal device, hardware configuration information of the target terminal device and version information of a version of a to-be-optimized target application program currently installed at the target terminal device;

determining, by the application market server according to the version information of the version of the to-be-optimized target application program, whether the version information is a latest version of the to-be-optimized target application program corresponding to the hardware configuration information of the target terminal device;

sending, by the application market server, an intermediate code file of the to-be-optimized target application program to a cloud server for compilation in response to the version information of the to-be-optimized target application program of the target terminal device not being the latest version, wherein the intermediate code file corresponds to the latest version of the to-be-optimized target application program;

receiving, by the application market server from the cloud server, upgrade information comprising a target code file that corresponds to the latest version of the to-be-optimized target application program in response to the version information of the version of the to-be-optimized target application program of the target terminal device not being the latest version of the to-be-optimized target application program, wherein the target code file is a real-time compiled file version of the intermediate code; and sending, by the application market server to the target terminal device, the target code file that corresponds to the latest version of the to-be-optimized target application program.

7. The method of claim 6, wherein after acquiring, by the application market server, the hardware configuration information of the target terminal device and the version information of the version of the to-be-optimized target application program currently installed at the target terminal device, the method further comprises:

sending, by the application market server to the cloud server, the intermediate code file for compiling in real-time the intermediate code file based on the latest version of the to-be-optimized target application program, and obtaining the target code file corresponding to the latest version of the to-be-optimized target application program.

8. A cloud server, comprising:
a processor configured to:
acquire hardware configuration information of a target terminal device from an application market server and an intermediate code file of a to-be-optimized target application program of the target terminal device from the application market server;

determine whether a version of the to-be-optimized target application program of the target terminal device is a latest version of a target application program based on a correspondence between the hardware configuration information of the target terminal device and version information of the target application program; and compile the intermediate code file of the to-be-optimized target application program based on a latest version information of the target application program in response to the version of the to-be-optimized target application program of the target terminal device not being the latest version of the target application program; and obtain a target code file corresponding to the latest version information of the target application program when compiling the intermediate code file; and a transmitter coupled to the processor and configured to send the target code file corresponding to the latest version information of the target application program to the application market server.

9. The cloud server of claim 8, wherein the processor is further configured to:

match the hardware configuration information of the target terminal device with different hardware configuration information of various terminal devices;

determine the latest version information of the target application program that corresponds to the hardware configuration information of the target terminal device based on a correspondence between different hardware configuration information of the various terminal devices and the version information of the target application program in response to the hardware configuration information of the target terminal device being included in the different hardware configuration information of various terminal devices;

match version information of the to-be-optimized target application program of the target terminal device with the latest version information of the target application program; and determine whether the version of the to-be-optimized target application program of the target terminal device is the latest version when the version information of the to-be-optimized target application program is matched to the latest version information of the target application program.

10. The cloud server of claim 8, wherein the processor is further configured to:

compile, based on upgrade information of a specified function in the latest version information of the target application program, the intermediate code file comprised in an installation package of the to-be-optimized target application program of the target terminal device;

obtain the target code file corresponding to the latest version information of the target application program in response to compiling the intermediate code file, wherein the target code file comprises the latest version information of the specified function; and package the target code file to generate an optimized installation package corresponding to the latest version information of the target application program.

11. The cloud server of claim 8, wherein the processor is further configured to:

compile, according to an upgrade information of a specified function in the latest version information of the target application program, the intermediate code file corresponding to the specified function;

generate the target code file corresponding to the latest version information of the specified function in response to compiling the intermediate code file corresponding to the specified function; and package the target code file to generate an incremental upgrade package of the target application program.

12. The cloud server of claim 8, wherein the processor is further configured to:

acquire hardware configuration information of at least one terminal device of at least one hardware configuration type from an application market using the application market server; and establish a correspondence between the hardware configuration information of the at least one terminal device and the latest version information of the target application program.

13. An application market server, comprising:
a processor configured to:
acquire hardware configuration information of a terminal device and version information of a version of a to-be-optimized target application program from the terminal device, wherein the to-be-optimized target application program is currently installed at the terminal device;

determine, according to the version information of the version of the to-be-optimized target application program, whether the version information is a latest version information of the to-be-optimized target application program corresponding to the hardware configuration information of the terminal device;

send an intermediate code file of the to-be-optimized target application program to a cloud server for compilation in response to the version information of the to-be-optimized target application program of the terminal device not being the latest version information, wherein the intermediate code file corresponds to the latest version information of the to-be-optimized target application program; and receive upgrade information comprising a target code file that corresponds to the latest version information of the to-be-optimized target application program from the cloud server in response to the version information of the version of the to-be-optimized target application program of the terminal device not being the latest version information of the to-be-optimized target application program, wherein the target code file is a real-time compiled file version of the intermediate code; and a transmitter coupled to the processor and configured to send the target code file that corresponds to the latest version information of the to-be-optimized target application program to the terminal device.

14. The application market server of claim 13, wherein the transmitter is further configured to send the intermediate code file corresponding to the version information of the to-be-optimized target application program to the cloud server for compiling the intermediate code file corresponding to the to-be-optimized target application program based on the latest version information of the to-be-optimized target application program.

15. A system for implementing application program installation by cloud compilation, comprising:
a terminal device, comprising a first processor;
a first transmitter coupled to the first processor and configured to:
  send hardware configuration information of the terminal device; and
  send version information of a version of a to-be-optimized target application program currently installed at the terminal device to an application market server; and
a first receiver coupled to the first processor and configured to receive upgrade information comprising a target code file that corresponds to a latest version information of the to-be-optimized target application program from the application market server in response to the version information of the version of the to-be-optimized target application program of the terminal device not being the latest version information of the to-be-optimized target application program; and
a cloud server comprising:
  a second processor configured to:
    acquire the hardware configuration information of the terminal device from the application market server and an intermediate code file of the to-be-optimized target application program of the terminal device from the application market server;
    determine whether a version of the to-be-optimized target application program of the terminal device is a latest version of the to-be-optimized target application program based on a correspondence between the hardware configuration information and version information of the to-be-optimized target application program;
    compile the intermediate code file of the to-be-optimized target application program based on the latest version information of the to-be-optimized target application program in response to the version of the to-be-optimized target application program of the terminal device not being the latest version of the to-be-optimized target application program; and
    obtain the target code file that corresponds to the latest version information of the to-be-optimized target application program when compiling the intermediate code file; and
  a second transmitter coupled to the second processor and configured to send the target code file corresponding to the latest version information of the to-be-optimized target application program to the application market server.

* * * * *